US010425280B2

(12) United States Patent
Zukerman et al.

(10) Patent No.: US 10,425,280 B2
(45) Date of Patent: Sep. 24, 2019

(54) METHOD FOR DETERMINING OPTIMAL LAYING ARRANGEMENT OF INFRASTRUCTURE LINK

(71) Applicant: City University of Hong Kong, Kowloon (HK)

(72) Inventors: Moshe Zukerman, Kowloon (HK); Zengfu Wang, Shaanxi (CN); Qing Wang, Kowloon (HK); Yu Wang, Kowloon (HK); Gang Wang, Kowloon (HK); William Moran, Balwyn (AU); Felipe Cucker, Kowloon (HK); Jun Guo, Guangdong (CN); Elias Tahchi, Quarry Bay (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/785,793

(22) Filed: Oct. 17, 2017

(65) Prior Publication Data

US 2019/0116090 A1    Apr. 18, 2019

(51) Int. Cl.

| H04L 12/24 | (2006.01) |
| G06Q 50/08 | (2012.01) |
| H04L 12/721 | (2013.01) |
| G06Q 10/06 | (2012.01) |

(52) U.S. Cl.
CPC ... *H04L 41/0836* (2013.01); *G06Q 10/06313* (2013.01); *G06Q 50/08* (2013.01); *H04L 41/0826* (2013.01); *H04L 41/145* (2013.01); *H04L 45/124* (2013.01)

(58) Field of Classification Search
CPC ... G06Q 10/10; G06Q 10/06; H04W 28/0226; H04W 16/10
See application file for complete search history.

(56) References Cited

U.S. PATENT DOCUMENTS

| 7,164,883 | B2* | 1/2007 | Rappaport | G06Q 10/10 455/3.01 |
| 8,612,283 | B1* | 12/2013 | Belanger | G06Q 10/0637 705/7.35 |
| 2009/0276265 | A1* | 11/2009 | Ahmed | G06Q 10/06 709/226 |
| 2010/0029282 | A1* | 2/2010 | Stamoulis | H04W 16/10 455/436 |
| 2011/0098846 | A1* | 4/2011 | Yeung | B07C 3/12 700/224 |
| 2013/0003605 | A1* | 1/2013 | Peterson | H04L 41/0826 370/255 |

(Continued)

*Primary Examiner* — Chi Ho A Lee
(74) *Attorney, Agent, or Firm* — Renner Kenner Greive Bobak Taylor & Weber

(57) ABSTRACT

A method for determining an optimal laying arrangement of a new infrastructure link for connection from a new site to an existing infrastructure network includes modeling a terrain of a region around and at the new site and the existing infrastructure network near the new site; modeling each factor affecting the laying arrangement as a respective cost function; applying a respective weighting to each of the cost function to determine a life-cycle cost function; and determining, based on the determined life-cycle cost function, an optimized laying arrangement with minimal life-cycle cost from the new site to a connection point in the existing infrastructure network.

19 Claims, 15 Drawing Sheets

(56) References Cited

U.S. PATENT DOCUMENTS

2015/0341941 A1* 11/2015 Nguyen .............. H04W 72/082
                                                    370/332
2016/0373309 A1* 12/2016 Forbes .................. H04L 41/145
2018/0124631 A1*  5/2018 Ramos de Azevedo ....................
                                                    H04W 28/0226

* cited by examiner

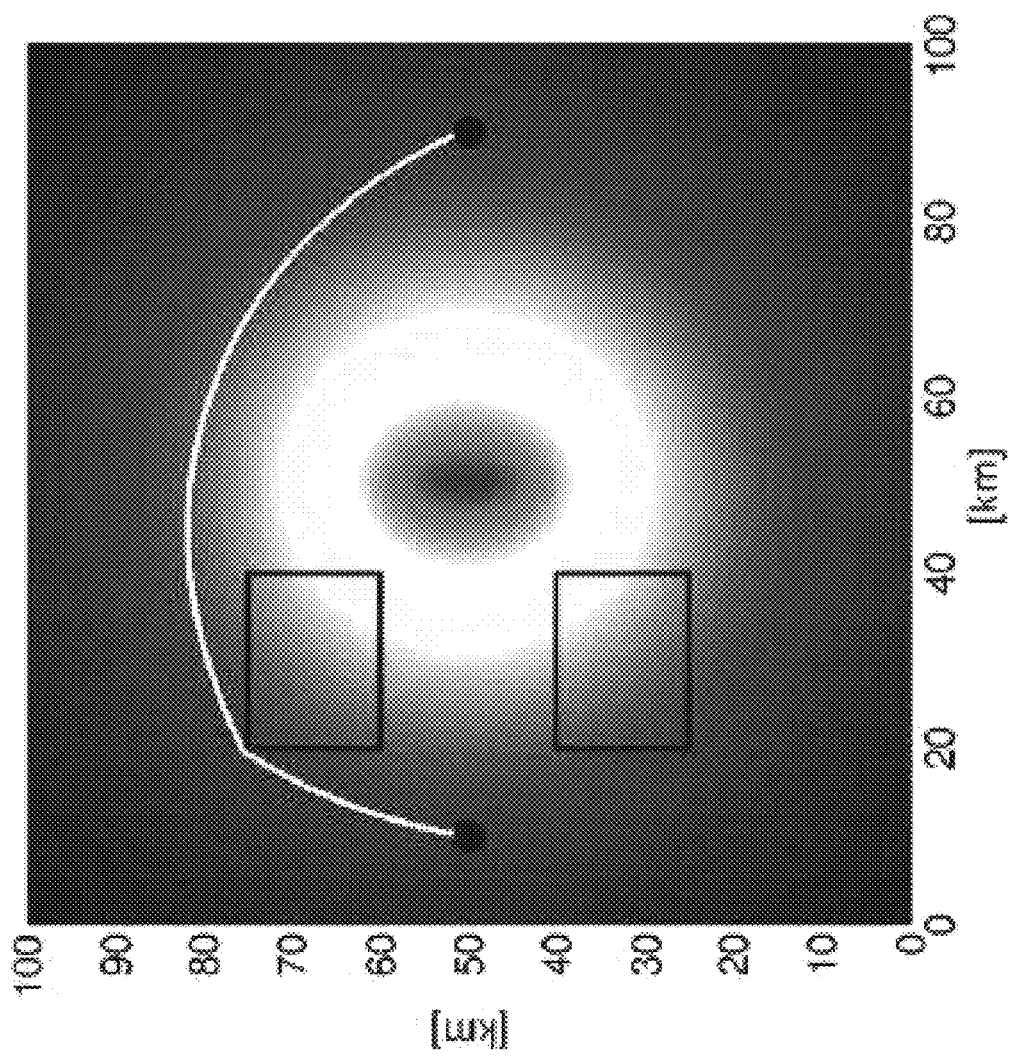

METHOD FOR DETERMINING OPTIMAL LAYING ARRANGEMENT OF INFRASTRUCTURE LINK

TECHNICAL FIELD

The invention relates to a method for determining optimal laying arrangement of infrastructure link. More particularly, although not exclusively, the invention relates to a method for determining an optimal path on how a new extension cable of a submarine cable network should be routed.

BACKGROUND

Critical infrastructures such as electricity, oil, gas, telecommunications, transportation, and water are essential to the functioning of modern economies and societies. As the world is increasingly interconnected, long-haul trans-regional, trans-national, or trans-continental links are playing a crucial role in transporting critical resources and information from one location to another. For example, it is known that submarine telecommunications cables carry over 95% of the global voice and data traffic. Russian gas that is delivered through the trans-European pipeline accounts for over a quarter of the total European consumption. Such critical infrastructure links are vulnerable to disasters and, if broken, can have severe social and economic consequences.

Among various natural disasters, earthquakes often cause the most catastrophic effects. For example, in 1987, the Ecuador earthquake resulted in the damage of nearly 70 km of the Trans-Ecuadorian oil pipeline. Loss of the pipeline deprived Ecuador of 60% of its export revenue, and it took 5 months to reconstruct the pipeline. In 2006, the Hengchun/Taiwan earthquake damaged eight submarine cables with a total of 18 cuts. As a result, Internet services in Asia were severely disrupted for several weeks, affecting many Asian countries. These events signify the impacts of earthquake hazards and the importance of enhancing the seismic resilience of critical infrastructure links.

There is a need to more reliably determine an optimal path of critical infrastructure link between two locations on the surface of the Earth, especially one that crosses a prone-to-damage area.

SUMMARY OF THE INVENTION

In accordance with a first aspect of the invention, there is provided a method for determining an optimal laying arrangement of a new infrastructure link for connection from a new site to an existing infrastructure network, comprising: modeling a terrain of a region around and at the new site and the existing infrastructure network near the new site; modeling each factor affecting the laying arrangement as a respective cost function; applying a respective weighting to each of the cost function to determine a life-cycle cost function; and determining, based on the determined life-cycle cost function, an optimized laying arrangement with minimal life-cycle cost from the new site to a connection point in the existing infrastructure network. The infrastructure link may be a fluid pipeline (e.g., oil, water, and gas pipes), electric power cables, electric data cables, optical cables, etc.

In one embodiment of the first aspect, the modeling of the terrain comprises modeling the terrain as a closed 2D triangulated manifold.

In one embodiment of the first aspect, the new infrastructure link comprises a new cable and the existing infrastructure network comprises an existing cable network.

In one embodiment of the first aspect, the connection point is a branching unit of an existing cable or a cable landing station of the existing cable network.

In one embodiment of the first aspect, the new cable comprises a telecommunication cable and the existing cable network comprises an existing telecommunication cable network. The telecommunication cable may be an optical cable.

In one embodiment of the first aspect, the new cable comprises a submarine cable and the existing cable network comprises a submarine cable network.

In one embodiment of the first aspect, the plurality of factor includes environmental factors and human factors.

In one embodiment of the first aspect, the optimized laying arrangement comprises the optimized laying route.

In one embodiment of the first aspect, the method further comprises displaying the optimized laying arrangement on a model of the terrain.

In one embodiment of the first aspect, the determination of the optimized laying arrangement comprises solving the following optimization equation:

$$\min_\gamma \mathbb{H}(\gamma) = \min_\gamma \int_0^{l(\gamma)} h(X(s))ds$$

such that $\gamma(A)=X_A$; and $\gamma(B)=X_B$;
where $\mathbb{H}(\gamma)$ is a total life-cycle cost for an infrastructure link, A and B denote two end points of the new infrastructure link, with B being an existing infrastructure link $\gamma_i$, i=1, 2, ..., n, given $\gamma_1, \gamma_2, ..., \gamma_n$.

In one embodiment of the first aspect, the method further comprises: transforming the optimization equation using Eikonal equation; and applying fast marching method to solve the transformed equation for determination of the optimized laying arrangement.

In accordance with a second aspect of the invention there is provided a non-transitory computer readable medium for storing computer instructions that, when executed by one or more processors, causes the one or more processors to perform a method for determining an optimal laying arrangement of a new infrastructure link for connection from a new site to an existing infrastructure network, comprising: modeling a terrain of a region around and at the new site and the existing infrastructure network near the new site; modeling each factor affecting the laying arrangement as a respective cost function; applying a respective weighting to each of the cost function to determine a life-cycle cost function; and determining, based on the determined life-cycle cost function, an optimized laying arrangement with minimal life-cycle cost from the new site to a connection point in the existing infrastructure network. The infrastructure link may be a fluid pipeline (e.g., oil, water, and gas pipes), electric power cables, electric data cables, optical cables, etc.

In one embodiment of the second aspect, the modeling of the terrain comprises modeling the terrain as a closed 2D triangulated manifold.

In one embodiment of the second aspect, the new infrastructure link comprises a new cable and the existing infrastructure network comprises an existing cable network.

In one embodiment of the second aspect, the connection point is a branching unit of an existing cable or a cable landing station of the existing cable network.

In one embodiment of the second aspect, the new cable comprises a telecommunication cable and the existing cable network comprises an existing telecommunication cable network.

In one embodiment of the second aspect, the new cable comprises a submarine cable and the existing cable network comprises a submarine cable network.

In one embodiment of the second aspect, the plurality of factor includes environmental factors and human factors.

In one embodiment of the second aspect, the optimized laying arrangement comprises the optimized laying route.

In one embodiment of the second aspect, the determination of the optimized laying arrangement comprises solving the following optimization equation:

$$\min_{\gamma} \mathbb{H}(\gamma) = \min_{\gamma} \int_0^{l(\gamma)} h(X(s))ds$$

such that $\gamma(A)=X_A$; and $\gamma(B)=X_B$;
where $\mathcal{N}(\gamma)$ is a total life-cycle cost for an infrastructure link, A and B denote two end points of the new infrastructure link, with B being an existing infrastructure link $\gamma_i$, i=1, 2, ..., n, given $\gamma_1, \gamma_2, \ldots, \gamma_n$.

In accordance with a third aspect of the invention, there is provided a system for determining an optimal laying arrangement of a new infrastructure link for connection from a new site to an existing infrastructure network, comprising: means for modeling a terrain of a region around and at the new site and the existing infrastructure network near the new site; means for modeling each factor affecting the laying arrangement as a respective cost function; means for applying a respective weighting to each of the cost function to determine a life-cycle cost function; and means for determining, based on the determined life-cycle cost function, an optimized laying arrangement with minimal life-cycle cost from the new site to a connection point in the existing infrastructure network. The infrastructure link may be a fluid pipeline (e.g., oil, water, and gas pipes), electric power cables, electric data cables, optical cables, etc.

BRIEF DESCRIPTION OF THE DRAWINGS

Embodiments of the invention will now be described, by way of example, with reference to the accompanying drawings in which:

FIG. 8 is an illustration of an exemplary laying arrangement avoiding high construction cost areas;

DETAILED DESCRIPTION OF THE PREFERRED EMBODIMENT

Figure 1:
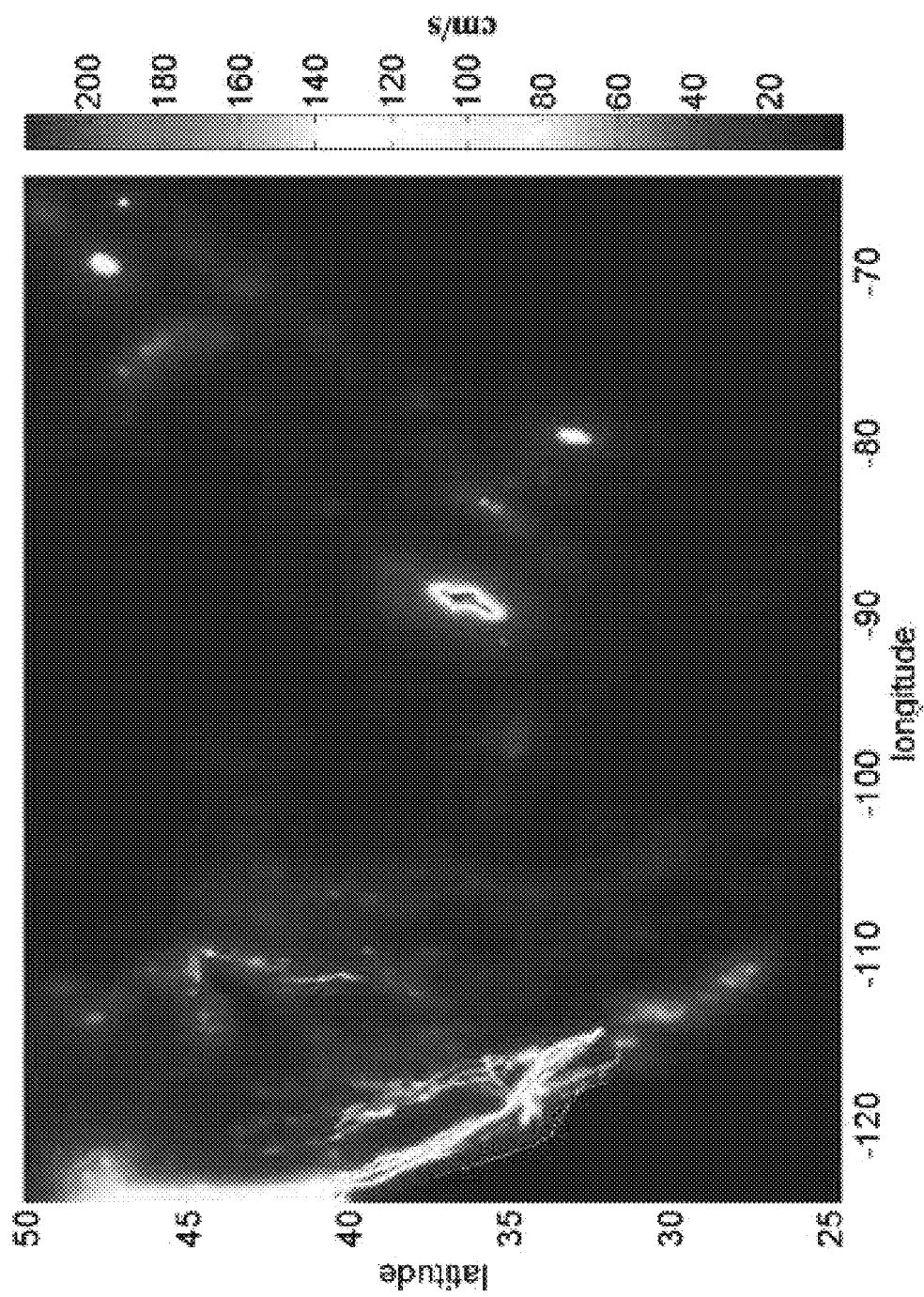
FIG. 1 is a shaded surface map of peak ground velocity of Contiguous United States (cm/s)

Path Optimization for Critical Infrastructure Links with Consideration to Seismic Resilience The invention relates to path optimization for a critical infrastructure link between two locations on the surface of the Earth that crosses an earthquake-prone area. In one embodiment, the focus is on path optimization of infrastructure links, such as undersea cables and long-haul oil/gas/ water pipelines, where surface distance is a reasonable measure of the length of a link. Preferably, the problem can be formulated as a multi-objective variational problem and the objective is to find the set of Pareto optimal paths for the infrastructure link with two objective functions.

The first objective is to minimize the cost associated with the construction of the infrastructure link. Connecting the two locations by a geodesic, i.e., the route with the shortest surface distance, may minimize the construction cost but can increase the risk of damage or break in the event of an earthquake if the route is close to the hazard.

The second objective is to minimize the number of potential failures (hence repairs) along the infrastructure link in the wake of earthquakes, which may serve as an index of the cost associated with the loss and reconstruction of the link in the event of failures.

The second objective in the present embodiment may be related to the notion of seismic resilience. Two key measures of resilience in general and seismic resilience include "reduced failure probabilities" and "reduced time to recovery." It has been shown that the larger the number of potential repairs, the greater is the failure probability of a link. In one embodiment of the invention, both the failure probability and the time to recovery are reduced by minimizing the total number of potential repairs for a given budget, and therefore improve seismic resilience.

The model of the present embodiment is built on the state of the art in geographic information systems (GIS) for terrain approximation and, ground movement-based risk evaluation, the latest development in civil engineering for seismic risk assessment of critical infrastructure links. Specifically, the model considers triangulated manifolds for representing the surface of the Earth, and ground motion intensity measures for estimating the link repair rate in the event of an earthquake since the correlations between them can be found statistically from past earthquakes. Based on this model, the multiobjective variational problem can be approached by first converting it into a single objective variational problem using the weighted sum method. Then, the problem can be further transformed into an Eikonal equation and solved by a computationally efficient algorithm based on fast marching method (FMM). Pareto optimal solutions that provide flexibility in path optimization for a critical infrastructure link can be obtained, while taking into consideration the fundamental trade-off between cost effectiveness and seismic resilience.

The Multiobjective Optimization Approach

As discussed above, the optimization of the path of a link between two locations in an earthquake-prone region is based on multiple objectives. In this embodiment, the following two objective functions are considered. The first is the laying cost (applicable to, e.g., a telecommunication cable), or construction cost (for, e.g., an oil pipeline). For brevity, thereafter, the term construction cost is used below to refer to both laying and construction cost. The second objective function is an index associated with the estimation of future number of repairs (or failures) of the link in a given time period (e.g., 100 years). Although the first objective is about cost incurred during construction, the second objective is about cost incurred in the (potentially, long term) future.

There are various factors associated with estimation of the first objective, namely, the construction cost. The length of the link is clearly a factor here, but it is not the only factor as the construction cost can vary from one location to another based on ground/soil condition, requirement for security arrangements, licensing, and various other factors. The reason that the problem has to be addressed as a multiobjective optimization is the second objective function.

Although the dollar value of the first objective is relatively clear, it is not so simple to assign a dollar value to potential link failures, mainly because different stakeholders have significantly different views of the cost of link failures. Although for a telecom cable owner, cable breaks incur cost associated with the repair needed minus any insurance payment received, for an insurance company, the cost consequence may be higher, and for the society, government or public the cost of cable failures can be much higher. In addition, failure of infrastructure links can lead to loss of lives in various cases of natural disasters. Given the multiplicity of stakeholders with different exchange rates between link failure risks and dollar values, it is appropriate to use a methodology based on multiobjective optimization that leads to a set of Pareto optimal solutions. Such optimal solutions provide for a given budget for construction cost, the planned path that minimizes the risk (as measured by predicted number of repairs), and for each given predicted number of repairs, the planned path that minimizes the construction cost.

Although the choice of the first objective is relatively straightforward, the choice of the second objective of the predicted number of repairs requires some discussion. Larger predicted number of repairs (failures) indicates both potential costs of repairs, as well as link downtime that may have significant societal cost. As an illustration, after the 2006 Taiwan Earthquake, eight submarine cable systems were found to be damaged with a total of 18 cable cuts. The repair for each cable cut was expected to require around 7 days. Although some repairs can be done in parallel, it still took over a month to achieve full restoration of connectivity following the Taiwan earthquake.

Accordingly, it can be determined that a reasonable index to represent the level of damage caused by an earthquake is the total number of repairs (or failures) of the link. To estimate the number of repairs, the data of ground motion in the past during a certain period of time, or simulations based on given geological knowledge, is used. This is considered reasonable as the geology generally does not change significantly over the service life of the link.

Since the relevant period of time the ground motion data has been measured (or simulated) applies to all points in the map equally, and since the data are based on the past, the abbreviated term of total number of repairs is used in the following without mentioning the period of time and the fact that it is "potential." This is the second objective to be optimized.

To calculate total number of repairs for a link, the term repair rate is used to indicate the predicted number of repairs per unit length of the link over a fixed time period into the future. An alternative term, less used in the earthquake literature, is failure rate. In addition, for a specific link, the repair rate varies for different points on the link and depends on various factors as well, such as the geology, link material, and ground/soil conditions. In another context considering earthquakes effects, the repair rate has been widely used to assess reliability of water supply networks, and to analyse the risk to gas distribution.

To estimate the repair rate that is used for estimating the total number of repairs of a link, data of ground motion in the past during a certain period of time, or simulations based on given geological knowledge, is used. The method of this embodiment also takes advantage of the extensive work of the United States Geological Survey (USGS) analysts who develop models for the potential effects of future earthquakes.

The total number of repairs (and repair rate) indicates both the expected time period between the seismic events that will result in repairs and their probability of occurrence. The higher the probability of occurrence and intensity of seismic events, the larger the ground motion intensity and therefore the larger the repair rate.

In this embodiment, two objectives—construction cost and number of potential repairs—are considered. Other objectives can be easily integrated into the method of the embodiment if they can be computed as an integral of some quantity along the path. Effectively, this means the objectives are local and additive across multiple path segments.

Modeling

A. Landform Model

In this embodiment, it is approximated that the region of the Earth's surface (including the sea bed) under consideration as a closed, connected, two-dimensional manifold in three-dimensional Euclidean space $R^3$, uniquely represented by a continuous, single-valued function $z=\xi(x, y)$, where z is the elevation and x and y are the Cartesian coordinates. In this example, caves, grottos, tunnels, etc., are ignored.

As information about the landforms is usually available in a quantized form (discrete grid), a triangulated piecewise-linear two-dimensional manifold M is used to approximate the Earth's landforms. Such triangulated manifold model makes it easier than other available models (e.g., the regular grid model) to consider rough surfaces and to accommodate irregularly spaced elevation data. In this example, it is assumed that the triangulated manifold model is complete; that is, it is a connected triangulated manifold surface in $R^3$ that consists of faces, edges, and vertices and satisfies the following conditions:

There are no isolated vertices.
Each edge belongs to exactly one triangle or is shared by just two triangles. Any two triangles intersect in a common vertex or edge, or not at all.
Any two points on the surface are connected by a path (possible through the middle of a triangle) on the surface connecting the two points.

These conditions do not pose significant modeling limitations because areas that do not satisfy these conditions, such as cliff faces, will be avoided by the link in any case. The particular details of how to address such areas in the model will be discussed below.

B. Construction Cost Model

As mentioned above, the construction cost is affected by various factors and can vary from one location to another. For $(x, y, z) \in M$, define a function $h(x, y, z)$ to represent the link construction cost at point $(x, y, z)$, where $z=\xi(x, y)$. This function gives the path planner the flexibility to consider different construction cost for different locations. For example, there are many areas that links (submarine telecommunications cables) must avoid, or require high construction costs:

areas that are of high ecological value (e.g., coral communities),
areas where special and costly licenses are required, incompatible seabed (e.g., rocky areas),
big mountains and even man-made obstructions, and any other areas that must be avoided Setting appropriately high values to the function $h(x, y, z)$, $z=\xi(x, y)$ will enable avoidance of such areas, or at least imposition of a high construction cost. In areas where the construction cost of the link is only its length, set $h(x, y, z)$ equal to a constant value, e.g., $h(x, y, z)=1$, where $z=\xi(x, y)$.

Let node A and node B be two fixed points with coordinates $X_A$ and $X_B$ in M, which have to be connected by a link, defined as a (Lipschitz continuous) curve $\gamma$ in M that connects the points A and B. The assumption of Lipschitz continuity is necessary to guarantee the existence of the solution of the Eikonal equation introduced below. Fortunately, in practice, this condition has negligible effect on the accuracy on the solution of this embodiment. Lipschitz continuity requires that the slope of the secant line joining two different points on the link is always bounded by a finite number. In other words, the link cannot be infinitely steep at one point. This, in practice, implies a very steep cliff (exactly vertical) that the link must avoid in any case. Avoidance of such areas is part of the optimization as discussed above. Let $H(\gamma)$ be the construction cost of the link $\gamma$. Assume:

The construction cost $H(\gamma)$ of the link $\gamma$ is quantified in terms of the cost per unit length at every point on the link, and is location-dependent.

For any particular point on the link, S, the construction cost per (arbitrarily) small length ds, $dH(\gamma)$, is calculated as the product of the construction cost $h(X_S)$ and length ds, i.e., $h(X_S)ds$. Here, capital letters (e.g., S, X, $X_S$, A, and B) are used to denote points, small letters (e.g., x, y, z) are used to denote the actual coordinates.

Then the construction cost of the link $\gamma$ is the integral of the construction cost at each point along the path of the link. That is, $$\mathbb{H}(\gamma) = \int_\gamma h(X) ds \qquad (1)$$

where $h(X) \in$ is the construction cost at location X.

Note that construction cost evaluation is a complicated process. Real costs depend on the specific application to be solved. The model in this embodiment can handle many constraints that can be modeled by an additive construction cost. However, it is unable to consider constraints with non-additive property (e.g., bulk discount).

C. Link Repair Model

The correlation of ground movements resulting from earthquakes and the repair rate is presented below. Since the link is laid on the surface of the Earth, the repair rate $g(X)$ is defined on the surface introduced previously, and therefore as a function of the coordinates x and y: $g(X)=g(x, y, z)$, $z=\xi(x, y)$. Typically, after an earthquake event, the area affected can be subdivided into many cells, and in each cell, repair rate of a link in the cell is determined by dividing the number of repairs by the length of the link in the cell.

Some publicly available information on the repair rate and its correlation with ground movement can be found in the context of water and gas pipelines. Many ground motion parameters have been used for relating repair rate with seismic intensity. In this embodiment, PGV is adopted to derive the repair rate since a significant correlation has been found between the two and PGV is widely used for deriving repair rate. An example of PGV map of Contiguous United States, derived based on Peak Ground Acceleration (PGA) (http://www.usgs.gov/) data provided by USGS, is shown in FIG. 1. In FIG. 1, different color represents different levels of PGV (in cm/s).

The gradual change of the color of the color bar, from blue to red, corresponds to increase of the PGV from the minimum value to the maximum value. Note that the application of the method in this embodiment is not limited to PGV and other information on ground motion can be used to estimate the repair rate. It is apparent that the more accurate the estimation of repair rate is, the more reliable are the path planning results.

As mentioned in the description of modeling of construction cost, assigning high positive repair rate values to the function g(x, y, z), z=ξ(x, y) will force the link to avoid high-risk areas. For example, the following are high-risk areas for submarine telecommunications cables:
  areas with wind or underwater turbines,
  marine vessel fairways,
  marine borrow area (e.g., gazetted dredging and sediment disposal area and sand deposit area), and
  anchorage areas and fishery areas.

Other adjustments can be made to the repair rate function to consider particular link attributes. Let G(γ) be the total number of repairs of the link γ. The assumptions made previously for the construction cost of the link H(γ) also apply for the total number of repairs; namely, assuming that:
  The total number of repairs G(γ) of the link γ is quantified in terms of the repair rate at every point on the link, and is location-dependent.
  For any particular point on the link, S, the number of repairs per (arbitrarily) small length ds, dG(γ), is calculated as the product of the repair rate $g(X_S)$ and length ds, i.e., $g(X_S)ds$.

Then the total number of repairs of the link γ is the integral of the repair rate at each point along the path of the link. That is, $$G(\gamma) = \int_\gamma g(X)ds \qquad (2)$$

where $g(X) \in R_+^1$ is the repair rate at location X.

Note that many influencing factors may affect failures of critical infrastructure links although mainly earthquake hazard is considered in this article. The method of this embodiment can be extended to include other factors, for example, landslides, if the corresponding repair rate models can be provided. Equivalently, as discussed above in relation to cost model, the repair rate model can include influencing factors, provided that they are local and additive in nature.

Problem Formulation and Solution

This section provides a rigorous formulation of the multiobjective optimization problem with objective functions— the construction cost and the total number of repairs, based on the models of landforms, construction cost, and the potential required repairs. It is then provided the algorithm for obtaining a set of path planning alternatives, each of which achieves optimal construction cost for each value of required repairs, and the least number of required repairs for a given budget. These sets of alternatives form the so-called Pareto optimal set. The use of terms "optimal" and "least" here refer the best the exemplary method can do given a grid size of the topographic data and any discrepancy that may be introduced by the manifold M relative to the real landform. As this grid size is reduced, potentially, better solutions may be obtained. The advantage of this approach is that it provides the true optimal results given the resolution level, the data, the construction cost model, and the failure model.

First, considering the functions of construction cost and repair rate defined on the manifold M that represents the real landform of the area under consideration, formulate path planning as a multiobjective variational optimization problem, called Problem 1. In this optimization problem, the objective functions are (1) the total construction cost and (2) the total number of repairs accumulated for any given path. The values of these objective functions are obtained by line integrals over each path. Then, transform the multiobjective variational optimization problem to a single combined objective problem, called Problem 2, where at each point on the manifold, a single function based on a fixed weighted average of the construction cost and the repair rate is considered. In this embodiment, Problem 2 provides a Pareto optimal set as the weights are varied in the calculation of the single combined objective function.

Problem 2 is transformed to the so-called Eikonal equation—a nonlinear partial differential equation (PDE) encountered in problems of wave propagation. Intuitively, given the Start Point A, a propagated wave front from this point represents a set of points that achieve the same value for the minimal line integral from Start Point A (to the point of the wave front) of the single combined objective function. A solution of the Eikonal equation provides fronts of the waves where the front most distant from Start Point A includes End Point B. Then the desired optimal path is obtained by moving from End Point B toward Start Point A through all the wave fronts by always choosing the steepest decent.

Recall that the proposed solution of Problem 2 requires a continuous manifold M, and that only the discretized topographical data used to define the triangulated manifold is available. There is still a need for an algorithm that can be used to obtain the optimal path over the triangulated manifold. In this embodiment, this is achieved by adopting the FMM, a continuous version of the Dijkstra shortest path algorithm. Different from the "discrete" Dijkstra's algorithm that imposes the path to travel exclusively on the edges of triangles in M, this "continuous" version of Dijkstra's algorithm enables the path to traverse through the interiors of triangles to find better solutions. The FMM is known to be optimal for solving the Eikonal equation (and therefore Problem 2 as the grid size of the triangulated manifold approaches zero).

The following provides the detailed mathematical formulation of the link path planning problem and then introduced the methodology of this embodiment. Based on the models of landforms, construction cost, and the potential required repairs, the multiobjective optimization problem of minimizing the construction cost and the total number of repairs is as follows:

$$\min_\gamma \Phi(\gamma) = (H(\gamma), G(\gamma))$$

$$\text{s.t.} \gamma(A) = X_A, \gamma(B) = X_B \qquad \text{Problem 1}$$

To calculate the construction cost and the total number of repairs of the link γ, parameterize the curve γ as functions of arc length, s; that is, every point $X \in \gamma$ can be represented by arc length s as X=X(s). Such a parameterization is also known as the natural definition of a curve. Then the construction cost and total number of repairs of the link γ are rewritten as $$H(\gamma) = \int_0^{I(\gamma)} h(X(s))ds, \quad G(\gamma) = \int_0^{I(\gamma)} g(X(s))ds \qquad (3)$$

where $h(X(s)), g(X(s)) \in R_+^1$ are the construction cost and the repair rate at location X(s), respectively, and I(γ) is the length of the link γ.

This problem can be formulated as a multiobjective variational optimization problem for which calculus of variations approaches are applicable. In the following, the path planning for solving Problem 1 is provided. Since Problem 1 has multiple objectives, in general, it is impossible to simultaneously optimize both the construction cost and the total number of repairs. Therefore, Pareto optimal solutions are sought. A standard method to solve Problem 1 is to formulate it as a single objective function optimization problem through the weighted sum method, i.e., $$\min_\gamma \Phi(\gamma) = \int_\theta^{l(\gamma)} f(X(s))ds, \qquad \text{Problem 2}$$

$$\text{s.t. } X(0) = X_A, X(l(\gamma)) = X_B$$

where $f(X(s)) = c \cdot h(X(s)) + g(X(s))$ and $c \in \mathbb{R}_+^1$. $f(X(s))$ is called the weighted cost. By the theory of multiobjective variational optimization, if $\gamma^*$ is an optimal solution for Problem 2, then it is Pareto optimal for the construction cost H and the total number of repairs G. With different weights c in Problem 2, distinct Pareto optimal solutions are produced.

In consequence of the formulation of Problem 2 as a single objective variational problem, the solution paths that minimize the integral are the minimum weighted cost paths. It is emphasized here that Problem 2 is a continuous problem. FMM, a consistent and computational efficient numerical algorithm for solving the Eikonal equation, is adopted here to solve Problem 2 in a continuous space. Comparing with discrete optimization methods such as the Dijkstra algorithm that compute the weighted cost on a discretized grid of the region of interest, FMM can be proved to converge to the continuous physical (viscosity) solution as the grid step size tends to zero, i.e., achieving global optimality. Also, FMM has the same computational complexity as Dijkstra algorithm, which is O(N log N), where N is the total number of discretized grid points of M.

For a PDE, a solution is required to be continuous and differentiable over the entire domain according to the classical definition. Continuous physical (viscosity) solutions are weak solutions that generalize the classical definition means that they are not necessarily everywhere differentiable. These appear to be meaningful solutions to PDEs representing physical problems.

A. Derivation of the Eikonal Equation

The first step in applying FMM is to transform the variational Problem 2 to the Eikonal equation. For any point $S \in M$, a cost function $\phi(S)$ that represents the minimal cumulative weighted cost to travel from end point B of the link to point S is defined as $$\phi(S) = \min_\beta \int_0^{l(\beta)} f(X(s))ds \qquad (4)$$

where $\beta \in \text{Lip}([0, +\infty); M)$ is a Lipschitz continuous path parameterized by its length, $$\|\beta'(s)\| = \left\|\frac{d\beta(s)}{ds}\right\| = 1,$$

$X(0) = X_B$, and $X(l(\beta)) = X_S$. By Equation (4) and the definition of $f$, and applying the fundamental theorem of the calculus of variations, it has been shown that $\phi(S)$ is the viscosity solution of the following Eikonal equation:

$$\|\nabla\phi(S)\| = f(S) = c \cdot h(S) + g(S), \phi(B) = 0 \qquad (5)$$

where $\nabla$ is the gradient operator and $\|\cdot\|$ is the 2-norm. For any point S, $\phi(S)$ is called the level set function; that is, $\{S \in M: \phi(S) = a\}$ is a curve composed of all the points that can be reached from point B with minimal cost equal to a. The optimal path(s) is (are) along the gradient of $\phi(S)$; i.e., orthogonal to the level curves. More precisely, construct the optimal path(s) by tracking backward from S to B, solving the following ordinary differential equation:

$$\frac{dX(s)}{ds} = -\nabla\phi, \text{ given } X(0) = X_s \qquad (6)$$

until point S, is reached, where $X \in M$. That is, the optimal path(s) from A to B for Problem 2 is (are) obtained by setting $S = A$ and then using a gradient descent of the level set function $\phi$. A finite-difference approximation, for example, the first-order Euler method or a second-order Heun's integration method can be used to compute (6). The former is adopted in this embodiment.

Note that Problem 2 may have multiple solutions. All the optimal solutions are Pareto optimal for the same construction cost H and the total number of repairs G. However, they represent different paths on the manifold. The designer may select one path by his/her preferences considering other factors beyond the construction cost and the total number of repairs.

B. The Update Scheme

The partial differential Eikonal equation cannot be solved analytically for an arbitrary nonnegative weighted cost function $f$. In fact, its solution does not necessarily need to be differentiable. Therefore, a numerical method is adopted in this embodiment to solve the Eikonal equation.

In previous sections, the landforms have been approximated by a complete two-dimensional triangulated manifold, and a discretized grid model of the region under consideration is derived. Accordingly, an update scheme to calculate the value of $\phi$ at each grid point is required. To compute a geodesic path on triangulated manifolds, a monotone update procedure can be applied to Equation (5).

Figure 2:
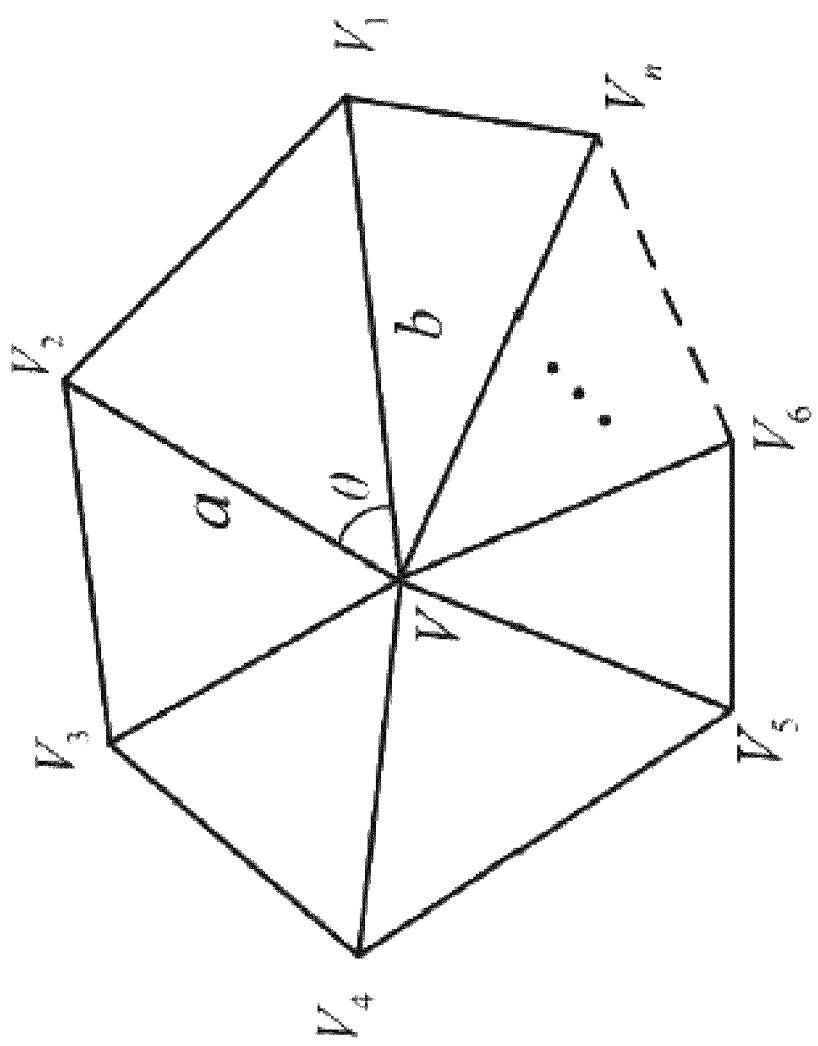
FIG. 2 is an illustration of acute triangulation around center vertex on landform manifolds in one embodiment of the invention.

For acute triangles of the triangulated landform manifolds, the update procedure is as follows. First, update the value of a center vertex, such as vertex V shown in FIG. 2, which is the intersection point of several triangles. For each of these triangles, for example, the triangle $\Delta VV_1V_2$ (assuming $\overline{\phi}(V_2) > \overline{\phi}(V_1)$ without loss of generality) in FIG. 2, the solutions of the following quadratic equation derived by representing equation (5) are calculated:

$$a'\varphi^2 + b'\varphi + c' = 0 \qquad (7)$$

where $\varphi = \phi(V) - \overline{\phi}(V_1)$ $a' = (a^2 + b^2 - 2ab \cos\theta)$ $b' = 2b(\overline{\phi}(V_2) - \overline{\phi}(V_1))(a \cos\theta - b)$ $c' = b^2((\overline{\phi}(V_2) - \overline{\phi}(V_1))^2 - f^2(V)a^2 \sin^2\theta) \qquad (8).$ The triangle $\Delta VV_1V_2$ is used to update the value of $\overline{\Phi}$ for vertex V as follows. If $\varphi > \overline{\phi}(V_2) - \overline{\phi}(V_1)$ and $$a \cos\theta < \frac{b(\varphi - (\overline{\phi}(V_2) - \overline{\phi}(V_1)))}{\varphi} < \frac{a}{\cos\theta} \qquad (9)$$

that is, the solution $\varphi$ is updated from within the triangle $\Delta VV_1V_2$, then $$\overline{\phi}(V) = \min\{\overline{\phi}(V), \varphi + \overline{\phi}(V_1)\} \qquad (10)$$

which means that the value for vertex V is updated by taking the minima of the current value $\overline{\phi}(V)$ and $\varphi + \overline{\phi}(V_1)$. Otherwise, p is not updated from within the triangle $\Delta VV_1V_2$. Only vertex $V_1$ or vertex $V_2$ is used to update the value for vertex V, in which case Equation (5) is rewritten as $$\frac{\phi(V) - \bar{\phi}(V_1)}{b} = f(V) \text{ or } \frac{\phi(V) - \bar{\phi}(V_2)}{a} = f(V).$$

Thus, the value for vertex V is updated by the following equation:

$$\bar{\phi}(V) = \min\{\bar{\phi}(V), bf(V) + \bar{\phi}(V_1), af(V) + \bar{\phi}(V_2)\} \quad (11)$$

In other words, the value for vertex V is updated by taking the minima of the current value $\bar{\phi}(V)$, $bf(V)+\bar{\phi}(V_1)$ and $af(V)+\bar{\phi}(V_2)$. Since each triangle containing the vertex V can produce a possible update value $\bar{\phi}$ for that vertex, to meet the upwind criterion, the smallest new value $\bar{\phi}$ for V is chosen.

For the update procedure described above, an acute triangulation is required, because the values of both vertex $V_1$ and vertex $V_2$ are needed to update the value of vertex V simultaneously. Although there is a guarantee for the existence of acute triangulations for a general polyhedral surface, no polynomial algorithm for constructing such triangulations has been found. For a given specific initially triangulated landform manifold with non-acute triangles, it is possible to split every obtuse triangle into acute ones. If not, an "unfolding" step is necessary for the remaining obtuse angles.

C. Algorithm for Path Planning

Given the update scheme described above, and the initial value $\phi(B)=0$, the next step is to calculate the value of $\phi$ at each point S on the triangulated grid of M. From the non-negativity of $f$ and the upwind difference structure, it is useful to imagine $\phi$ as a wave function, and note that the wave propagates "one way"; that is, from B outward, and the value of $\phi$ at any point depends only on adjacent vertices having smaller values. Based on these observations, the value of the grid points is updated using the FMM method as detailed below:

1. Initialization. All end points (e.g., B) are tagged as Frozen. Their nearest neighbors (one grid point away) are then tagged as Near and the value of these nearest neighbors is updated by solving equation (7) using Frozen points. The remaining grid points are tagged as Far.
2. The point with minimum value $\phi$ among all points with the tag Near is retagged to Frozen. If there are no such points, the algorithm is terminated. If there is exactly one such point, return to Step 3. If there are more than one such point, pick one arbitrarily and return to Step 3.
3. Find the nearest neighbors that are either Far or Near of the Frozen point found in Step 2, and update their values by solving equation (7) using the Frozen points and change their tag to Near if they are Far.
4. Go back to Step 2.

Based on the above procedure, the status of points can only change from Far to Near or from Near to Frozen. The tags of points cannot be changed in an opposite direction, i.e., from Near to Far or from Frozen to Near. In Step 3, each updated point is assigned a new value that is less than its previous value. If the point is Far, it is tagged Near. In Step 2, the tag of one and only one point is changed in each loop. Therefore, the FMM is a one-pass algorithm; it does not have to "go back and correct an accepted value (of a Frozen point)". Since it is possible to locate the grid point with minimum value $\phi$ among all points with tag Close (in Step 2) using a heap algorithm with time complexity O(N), it is easily seen that FMM can be implemented with time complexity O(N log N) if N is the total number of points in the grid.

Based on the landforms model, the construction cost model and the potential required repairs model given, and the FMM introduced above, the method of this embodiment provides an algorithm, called Algorithm 1, for path planning on a topographic surface. By setting different values of c in Problem 2, it is possible to obtain different Pareto optimal solutions of the construction cost and the total number of repairs. However, since FMM is a numerical method to solve the Eikonal equation (5), computational numerical errors arise in running Algorithm 1, one source of which is the approximate computation of the Eikonal equation (5) through solving equation (7). The approximate solution has first-order accuracy, i.e., the size of the error is proportional to the grid size. The other source of the numerical errors is the approximate computation of Equation (6), done in this example by Euler's method, and this again has first-order accuracy. For more accurate, higher order approximation, other methods can be used. Because of these numerical errors, erroneous results may occur, which can be identified by checking the dominance of the solutions. If one solution is dominated by other solutions, then it is not Pareto optimal and therefore be ignored. At the end, only the non-dominated results are presented to obtain the approximate Pareto front that is also called non-dominated front. Examples of such non-dominated optimal solutions will be described below.

Algorithm 1
Algorithm for path planning in the region of interest $\mathbb{D}$.

Input: Region $\mathbb{D}$ (modelled as $\mathbb{M}$), spatially distributed PGV data and construction cost data on $\mathbb{D}$, mesh size $\Delta_x$, $\Delta_y$, Start Point A, End Point B, c, step size $\tau$;

Output: Path $\gamma$ with minimum weighted cost;

1: Discretize $\mathbb{D}$ rectangularly with $\Delta_x$ in x and $\Delta_y$ in y, and denote the set of points on the grid by $\Gamma$;
2: Based on the PGV data on $\mathbb{D}$, calculate the repair rate g(i, j) for each grid point (i, j) $\in \Gamma$;
3: For each grid point (i, j) $\in \Gamma$, let f(i, j) = c · h(i, j) + g(i, j);
4: Create edges, faces and obtain a complete triangulation (i.e., $\mathbb{M}$) of $\mathbb{D}$ based on $\Gamma$;
5: Denote the approximate value of $\phi$ by $\bar{\phi}$ satisfying $\bar{\phi}(i, j) \approx \phi(i\Delta_x + x_B, j\Delta_y + y_B)$. Let $\bar{\phi}(0, 0) = 0$ and set the End Point B to Near. Define the neighbors of a grid element (i, j) to be the set $\Gamma_{(i, j)}$.
6: While Near list is not empty do
7:  Find a point (i, j) with the minimum value $\bar{\phi}$ in Near list, and set it to be Frozen.
8:  For each point (i', j') $\in \Gamma_{(i, j)}$, if (i', j') is not Frozen, for each face $\zeta \in \Sigma$, $\Sigma = \{\zeta, (i', j') \in \zeta\}$, calculate $\bar{\phi}(i', j')$ and update its value with the minimum one using Equations (10) or (11).
9:  If (i', j') is Far, update its value by $\bar{\phi}(i', j')$ and add it in the Near list; otherwise update its value by minimum of $\bar{\phi}(i', j')$ and its current value.
10: end while
11: Let $\gamma_0 = X_A$ and k = 0.
12: While $\|\gamma_k - X_B\|^2 > \varepsilon$ do
13:  Compute the gradient $G(\gamma_k)$ using finite-difference based on Equation (6).
14:  Compute $\gamma_{k+1} = \gamma_k - \tau G(\gamma_k)$, where $\gamma_k$ is an approximation of $\gamma(t)$ at time t = k$\tau$.
15: end while
16: return $\gamma$.

Figure 3:
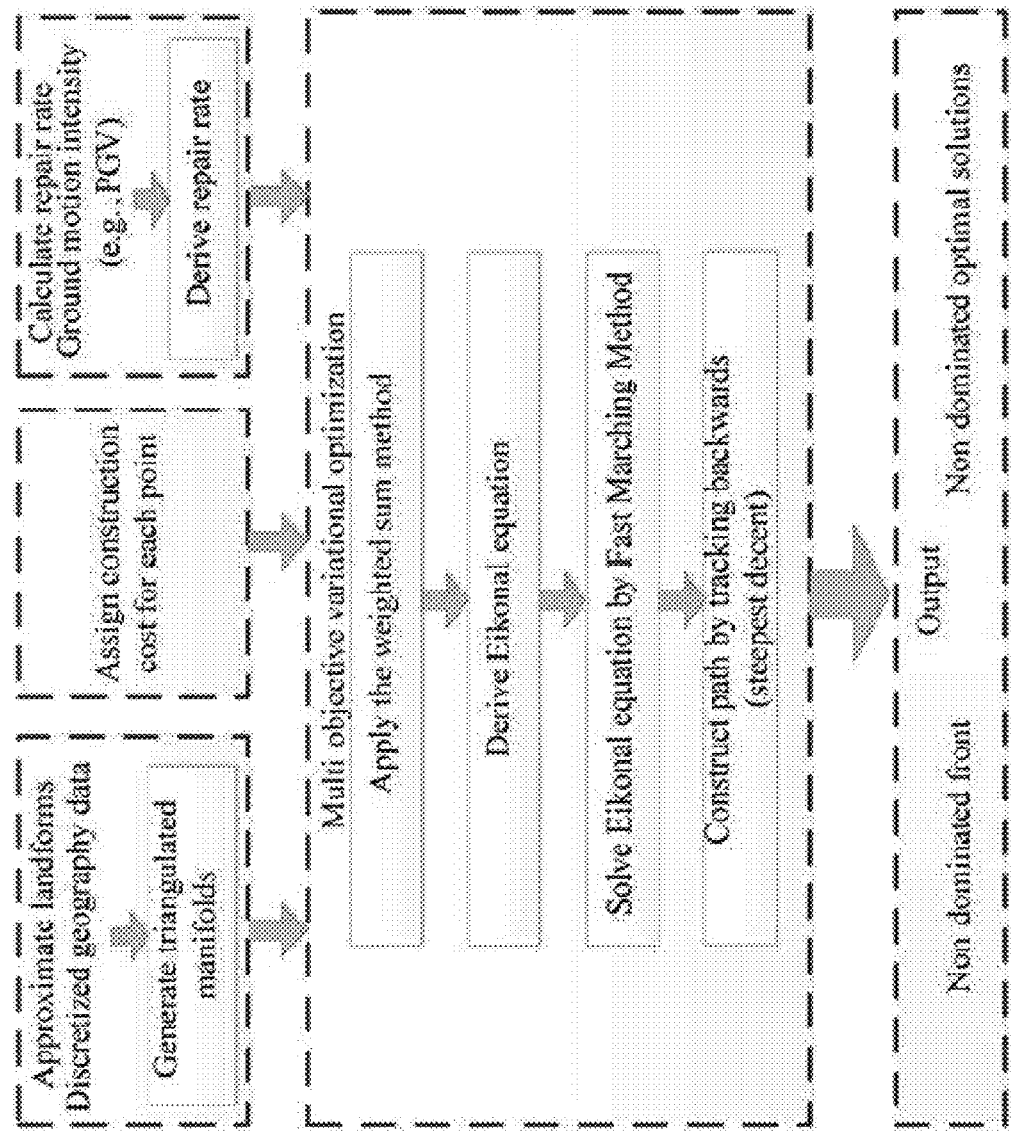
FIG. 3 is a flow diagram illustrating a method for determining optimal laying arrangement of infrastructure link in one embodiment of the invention.

The method used to solve the problem of how to find the optimal path of a link to connect two points across an earthquake prone area is shown in FIG. 3. It should be noted that in general Problem 2, being a continuous problem, does not have an analytical solution except that the integrand f(X(s)) is very special. As mentioned, the (continuous) solution(s) of Problem 2 (i.e., path(s)) is (are) perpendicular to the solution of the (continuous) Eikonal equation (5). Again, in general, the analytical solution of Eikonal equation (5) cannot be readily derived. Thus, there is a need to use numerical methods. In this embodiment, FMM is used to solve Eikonal equation (5). The (discrete) approximate solution derived by FMM converges to the continuous physical (viscosity) solution of Eikonal equation (5) as the grid step size of the topographic data tends to zero. As a result, the (discrete) approximate solutions (i.e., paths) converge to the (continuous) solutions of Problem 2 as well when the grid step size approaches to zero. High resolution topographic data are available and so can be used. In future, with technological advances, and the consequent reduction in grid step size, the method of this embodiment can provide increasingly accurate solutions.

Applications

This section illustrates the applications of Algorithm 1 to scenarios based on 2D and 3D landforms.

Starting with a simple case of 2D topography, where the PGV data are obtained by simulations by the Probabilistic Seismic Hazard Analysis (PSHA) method. Then, the algorithm is applied to two scenarios of 3D landforms based on earthquake hazard assessment data from USGS. Let $\delta$ (dollars/km) be the construction cost per km. Assume $\delta=1$ in the following examples. Acknowledge that the construction cost of a link is more than \$1 per km, but if all the costs is normalised to unit cost per kilometer, then the path obtained will be a correct path. The construction cost and the total number of repairs of different links are estimated. It is possible to take advantage of the low complexity of FMM, and generate many runs for different c values to obtain the set of non-dominated optimal solutions.

A. Application of the Algorithm to a 2D Landform

Figure 6A:
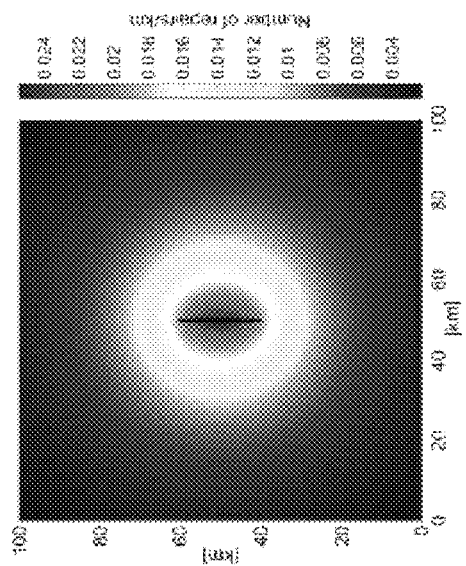
FIG. 6A is a shaded surface map of mean peak ground velocity for an exemplary 20 km line source.

PGV data is generated based on PSHA for a simple example in which the path of the link is planned on a planar (2D) region. A single line source (e.g., a fault line where earthquake epi-center may occur) of earthquakes of length 20 km located in a 2D landform region [0, 100 km]×[0, 100 km] is shown in FIG. 6A. The coordinates of the two end points $(x_E, y_E)$ and $(x_F, y_F)$ of the line source are (50 km, 40 km) and (50 km, 60 km), respectively. Following the bounded Gutenberg-Richter model, this source produces earthquakes of magnitude between $m_{min}=5$ and $m_{max}=6.5$ with the probability density function (PDF)

$$f_M(m) = \frac{b \cdot 2.3026 \cdot 10^{-b(m-m_{min})}}{1 - 10^{-b(m_{max}-m_{min})}}, m \in [m_{min}, m_{max}] \quad (12)$$

Figure 4:
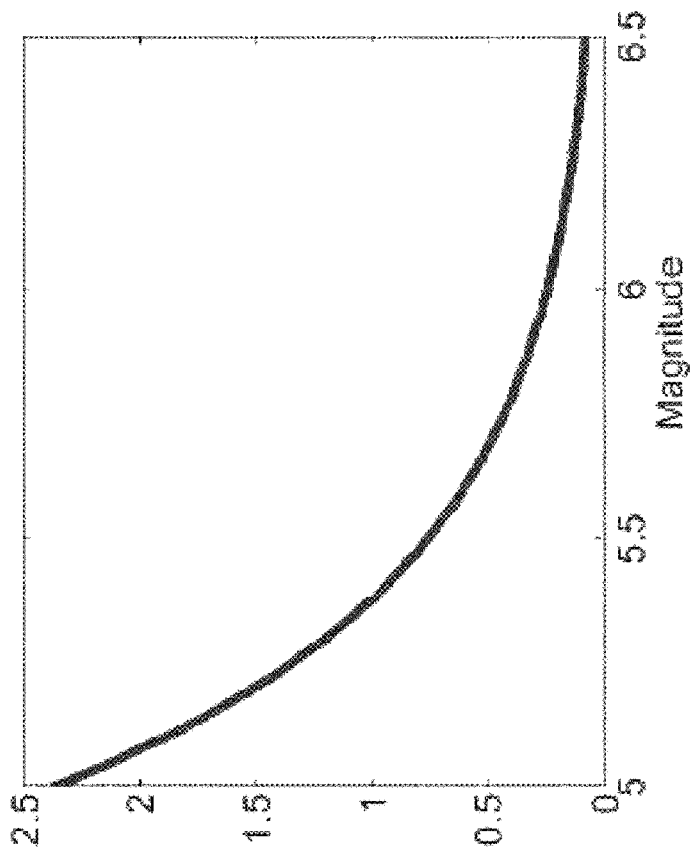
FIG. 4 is a graph showing probability density function when b=1 for equation (12)

Note that the magnitude m is dimensionless (as it is given in Richter scale). Assume b=1 and show the PDF (12) in FIG. 4.

Figure 5:
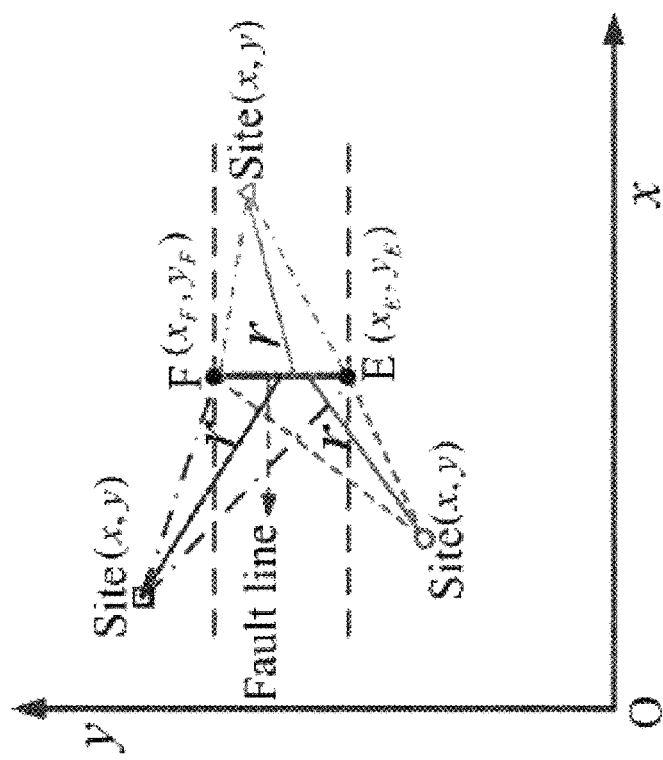
FIG. 5 is a graph showing derivation of the cumulative distribution function in equation (14)

Also assume that the spatial distribution of the epi-center of earthquakes is uniform along the line source. The geometry of the source as shown in FIG. 5 yields that the cumulative distribution function (CDF) of the epi-center distance r from a site (x, y) to the source is $$F_R(r) = P(R \leq r) = \frac{r'}{y_F - y_E} \quad (13)$$

where r' is the length of the source within distance r and $y_F - y_E$ is the length of the source. Specifically, when $y < y_E$, for example, as shown by the site with circle (red color) in FIG. 5, if $d_E \leq r \leq d_F$, then $r' = \sqrt{r^2 - (x-x_E)^2} - (y_E - y)$, where $d_E$ and $d_F$ are the distances from the site to E and F, respectively. Otherwise, $F_R(r)=0$ if $r<d_E$ and $F_R(r)=1$ if $r>d_F$. The CDF of r when $y_E \leq y \leq y_F$ and $y>y_F$ can be derived in a similar way. The complete CDF of r is as follows:

$$F_R(r) = \begin{cases} y_1, & y < y_E, d_E \leq r \leq d_F \\ y_2, & y_E \leq y \leq y_F, |x-x_E| \leq r \leq d_{max} \\ y_3, & y > y_F, d_F \leq r \leq d_E \end{cases} \quad (14)$$

where $y_1 = \frac{r_E - (y_E - y)}{y_F - y_E}$, $y_2 = \frac{\min(y_F, y+r_F) - \max(y_E, y-r_E)}{y_F - y_E}$, $y_3 = \frac{r_F - (y - y_F)}{y_F - y_E}$, $d_E = \sqrt{(x-x_E)^2 + (y-y_E)^2}$, $d_F = \sqrt{(x-x_F)^2 + (y-y_F)^2}$, $r_E = \sqrt{r^2 - (x-x_E)^2}$, $r_F = \sqrt{r^2 - (x-x_F)^2}$, and $d_{max} = \max(d_E, d_F)$.

PDF $f_R(r)$ for r is obtained by taking the derivative of the above CDF.

Given potential earthquake magnitudes and locations, ground motion measures, such as PGV, have been observed to be well represented by a log-normal distribution, i.e., ln $v \sim \mathcal{N}(\bar{\mu}(m,r), \sigma^2)$, where $\mu(m, r)$ and $\sigma$ are the mean and standard deviation of ln v given by the attenuation relationship. In this case, use the following dimensionally homogeneous version of the empirical formula for the mean of ln v $$\mu(m, r) = \ln \frac{\mu'(m, r)}{a_1} = 2.11 + 1.07m - 1.55 \ln \frac{r + a_2}{a_3} \quad (15)$$

where $a_1=1$ cm/s, $a_2=25$ km, and $a_3=1$ km. Let $\sigma=0.64$. By law of total probability, the PDF of PGV for a site (x, y) is $$p(v_{x,y}) = \int_M \int_R p(v_{x,y}|m,r) f_M(m) f_R(r) dm dr \quad (16)$$

and then the mean PGV is $\bar{v}_{x,y} = \int_0^{+\infty} v_{x,y} p(v_{x,y}) dv$. Note that the magnitude m and the epi-center distance r in the PSHA framework are usually assumed independent. Since there is no analytical expression for $\bar{v}_{x,y}$, numerically compute the PDF of the PGV. In this computation, quantize the PGV, magnitude, and distance into equal bins with sizes 0.1 cm/s, 0.1, and 0.1 km, respectively.

Figure 6B:
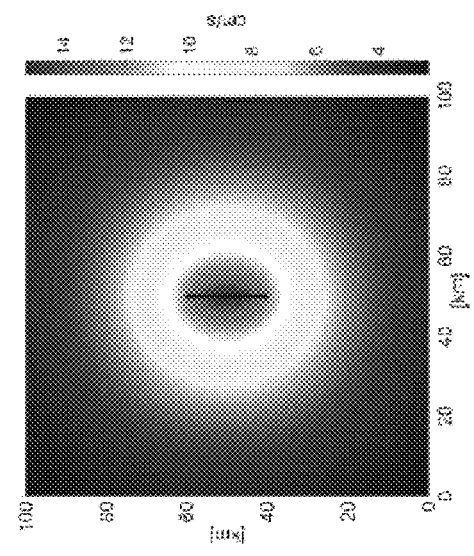
FIG. 6B is a shaded surface map showing repair rate corresponding to FIG. 6A.

The shaded surface map of the mean PGV derived based on above procedure is shown in FIG. 6A. Then the PGV is converted to repair rate by the following dimensionally homogeneous version of the empirical formula:

$$\ln \frac{g(x, y)}{a_4} = 1.30 \cdot \ln \frac{\bar{v}_{x,y}}{a_5} - 7.21 \quad (17)$$

where $a_4$=1 km−1 and $a_5$=1 cm/s. The resulted repair rate is presented in FIG. 6B.

TABLE 1

Key notations

| | |
|---|---|
| $R^4$ | n-dimensional Euclidean space |
| M | triangulated piecewise-linear two-dimensional manifold in $R^3$ |
| (x, y, z), z = ξ(x, y) | coordinates of a point in M |
| h(x, y, z) | construction cost at point (x, y, z) |
| A, B | two nodes to be connected by a link in M |
| $X_A$, $X_B$ | coordinates of A, B |
| γ | a link, a path or a curve representing the link |
| H(γ) | the construction cost of the link γ |
| S, X, $X_S$ | points in M |
| g(X) | repair rate at location X |
| G(γ) | total number of repairs of the link γ |
| l(γ) | length of the link γ |
| f(X(s)) | weighted summation of construction cost and repair rate at location X(s) |
| φ(S) | minimal cumulative cost to travel from one point to a point S |
| ∇ | gradient operator |
| ‖ • ‖ | 2-norm |
| $\triangle VV_1V_2$ | a triangle in M |
| $\bar{\phi}(V)$ | value at V calculated by numerical method |
| Γ | grid point set of M |
| N | total number of discretized grid points of M |
| m | earthquake magnitude |
| r | epicenter distance from a site to a fault line source |
| v | PGV |
| c | weight of construction cost |
| μ | mean of ln v |
| $f_M(m)$ | PDF of the earthquake magnitude m |
| $f_R(r)$, $F_R(r)$ | PDF, CDF of the epicenter distance r |

TABLE 2

Different optimal paths taking into account the construction cost and the total numbers of repairs in the case of the example line source

| | c(×10⁻³) | | | | | | | |
|---|---|---|---|---|---|---|---|---|
| | 0.1 | 0.5 | 1 | 2.5 | 5 | 7.5 | 10 | 25 |
| Cost (dollars) | 154.03 | 147.63 | 134.68 | 113.05 | 99.80 | 93.70 | 90.15 | 80.00 |
| Total number of repairs | 0.630 | 0.632 | 0.641 | 0.675 | 0.720 | 0.756 | 0.787 | 0.981 |

Figure 7A:
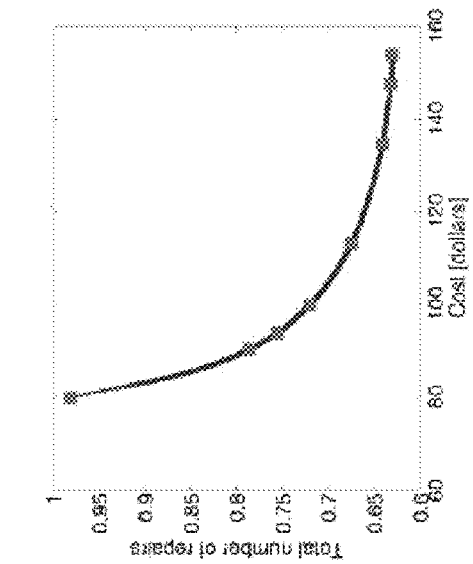
FIG. 7A is a graph showing the non-dominated optimal solutions (i.e., paths) when c=$10^{-4}$, $5\times10^{-4}$, $10^{-3}$, $2.5\times10^{-3}$, $5\times10^{-3}$, $7.5\times10^{-3}$, $10^{-2}$, and $2.5\times10^{-2}$ respectively.
Figure 7B:
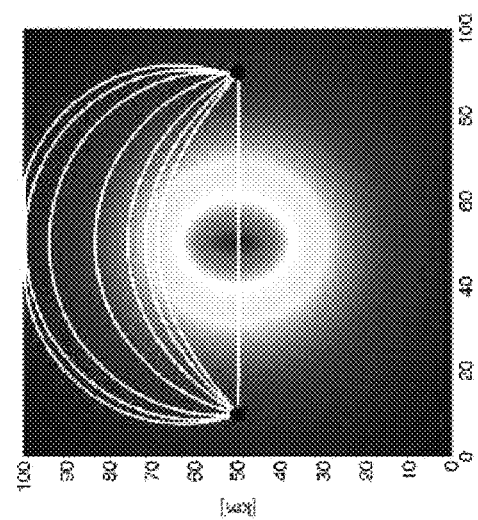
FIG. 7B is a graph showing non-dominated front for two objectives—link construction cost and total number of repairs, where the red squares are the non-dominated optimal values of the paths in FIG. 7A.

One example involves planning the link from the site (10 km, 50 km) to the site (90 km, 50 km). In order to see how the construction cost of the link affects the results of the path planning, set the weight of the construction cost to different values, and then calculate the construction cost and the total number of repairs of the resulting optimal links obtained by the method. The results are shown in Table 2 and the corresponding paths are shown in FIG. 7A. From Table 2 and FIG. 7A, the trade-off between the total number of repairs and the construction cost of the link can be seen. Reducing the total number of repairs requires a higher construction cost link. To derive the non-dominated front and the set of non-dominated optimal solutions for the two objectives: link construction cost and total number of repairs, vary the weight of the construction cost (c) in the range from 10⁻⁴ to 10⁻¹, and then calculate the optimal paths increasing c by in each path planning optimization. FIG. 7B shows the non-dominated front. This non-dominated front and the corresponding non-dominated optimal solutions provide the results of the optimization problems of minimizing link construction cost subject to a constraint on the total number of repairs (or equivalently, on the level of survivability) and minimizing the total number of repairs (or maximizing survivability) subject to a constraint on the link construction cost. To verify the ability of Algorithm 1 to avoid high construction cost areas, set up two areas, [20, 60 km]×[40, 75 km], and [20, 25 km]×[40, 40 km] which the link must avoid. For each location in these two areas, let the construction cost function h(x, y)=1,000. FIG. 8 shows the path of the link in the case c=5×10⁻³. As shown, the link successfully avoids the two high construction cost areas.

B. Application of the algorithm to 3D landforms based on USGS seismic hazard map In this example, earthquake hazard assessment data (PGA) from USGS (http://www.usgs.gov/)—widely applied in seismic provisions of building codes, insurance rate structure, risk assessment, and other public policy—is used.

Figure 9B:
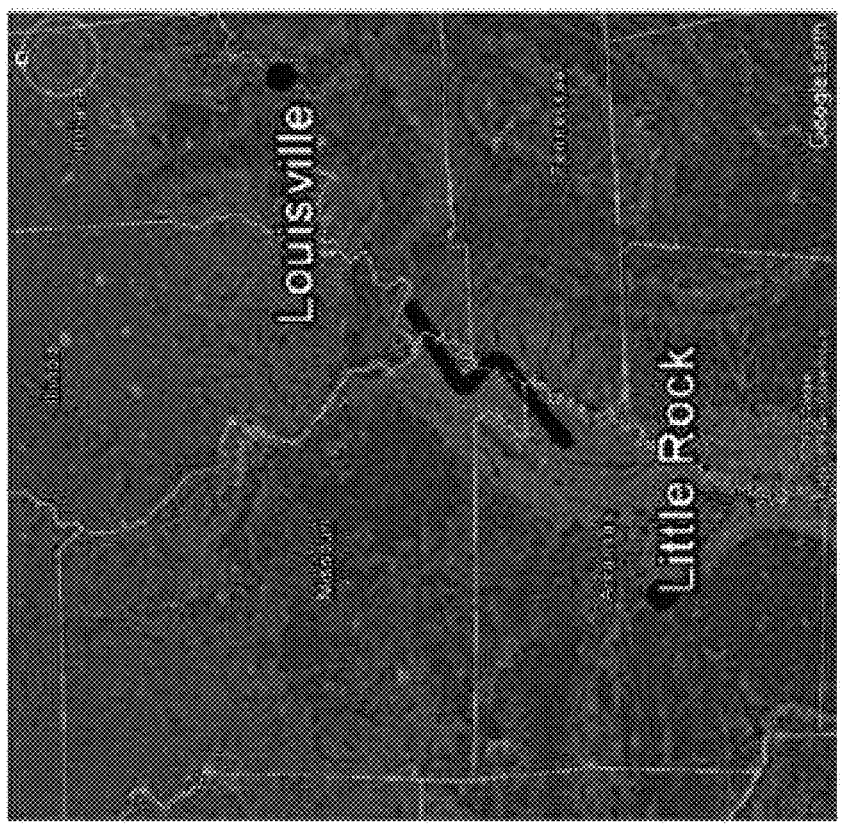
FIG. 9B is a map showing an exemplary region $D_2$, where the black points show the cities to be connected and the black lines illustrate the fault lines.
Figure 9A:
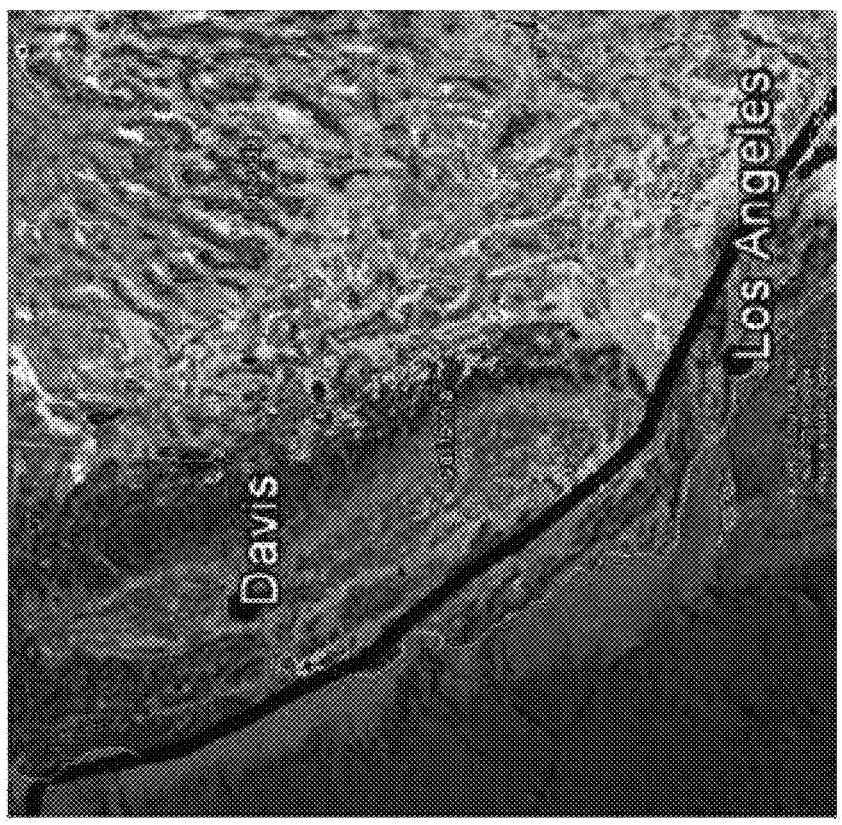
FIG. 9A is a map showing an exemplary region $D_1$, where the black points show the cities to be connected and the black lines illustrate the fault lines.

It contains space-delimited, rectangularly gridded data in 0.05° increments in longitude and latitude. Paths of links in two different regions $D_1$ [40.23°, −124.30°]×[32.60°, −114.30°] and $D_2$ [40.54°, −95.00°]×[32.75°, −85.50°], as shown in FIG. 9, are planned.

The land of region $D_1$, including almost the whole California state and a large part of Nevada, is located on the west coast of United States closed to the Pacific Ocean. There are several fault lines throughout $D_1$, of which the famous San Andreas fault line is a major one. Northeast $D_1$ is a large desert. Widely flat land of south-eastern $D_1$ is punctuated by some irregular mountain peaks such as Mt Whitney at 14,494 ft. The famous Central Valley, which is closed to the San Andreas fault line, is located in the center of $D_1$.

Region $D_2$ is in the U.S. central and consists of several states such as Missouri, Illinois, Indiana, Kentucky, Tennessee, Alabama, Mississippi, and Arkansas. Most of region $D_2$ is plain, especially the central areas. A basin landform is located on the common border of Missouri, Arkansas, Mississippi, and Tennessee. The New Madrid fault line is located in region $D_2$.

Figure 10B:
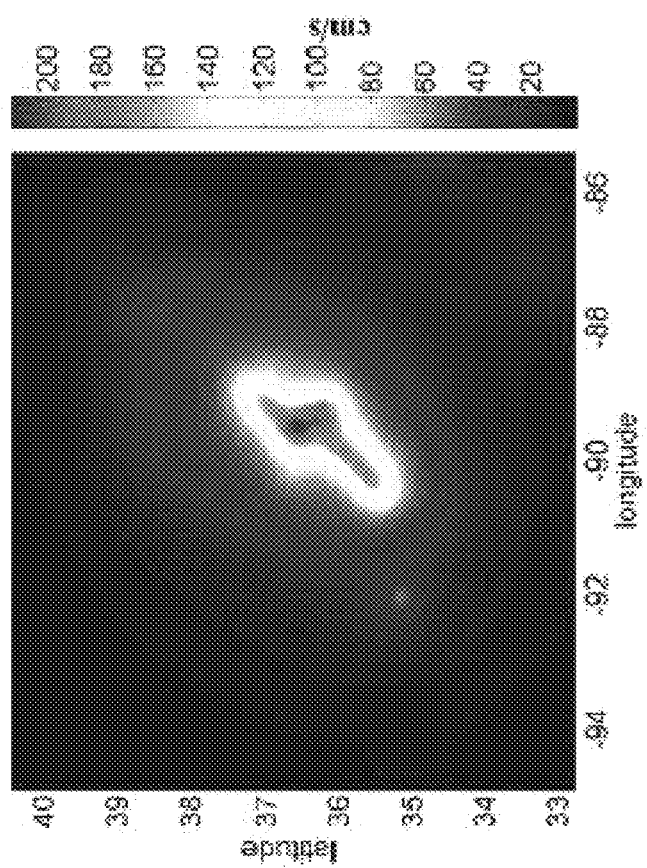
FIG. 10B is a shaded surface map of peak ground velocity (cm/s) for region $D_2$.
Figure 10A:
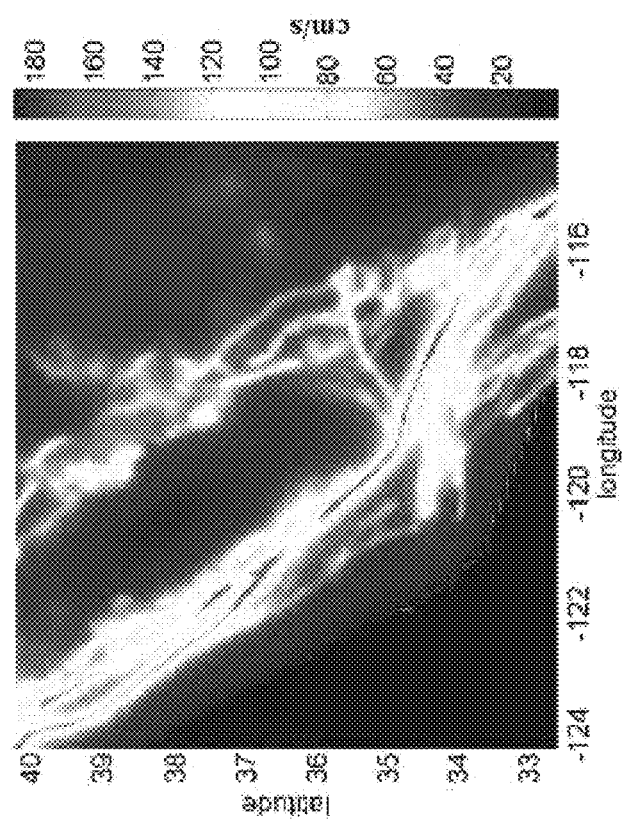
FIG. 10A is a shaded surface map of peak ground velocity (cm/s) for region $D_1$.

To calculate the repair rate of the link, first download the PGA data (2% probability of exceedance in 50 years, Vs30=760 m/s) for each gridded geographical point and then convert it to PGV by the following dimensionally homogeneous version of the empirical equation:

$$\log_{10}\frac{v}{a_6} = 1.0548 \cdot \log_{10}\frac{PGA}{a_7} - 1.1556 \qquad (18)$$

where $a_6$=1 cm/s and $a_7$=1 cm/s². The shaded surface maps of PGV of the two regions are shown in FIG. 10.

Figure 11:
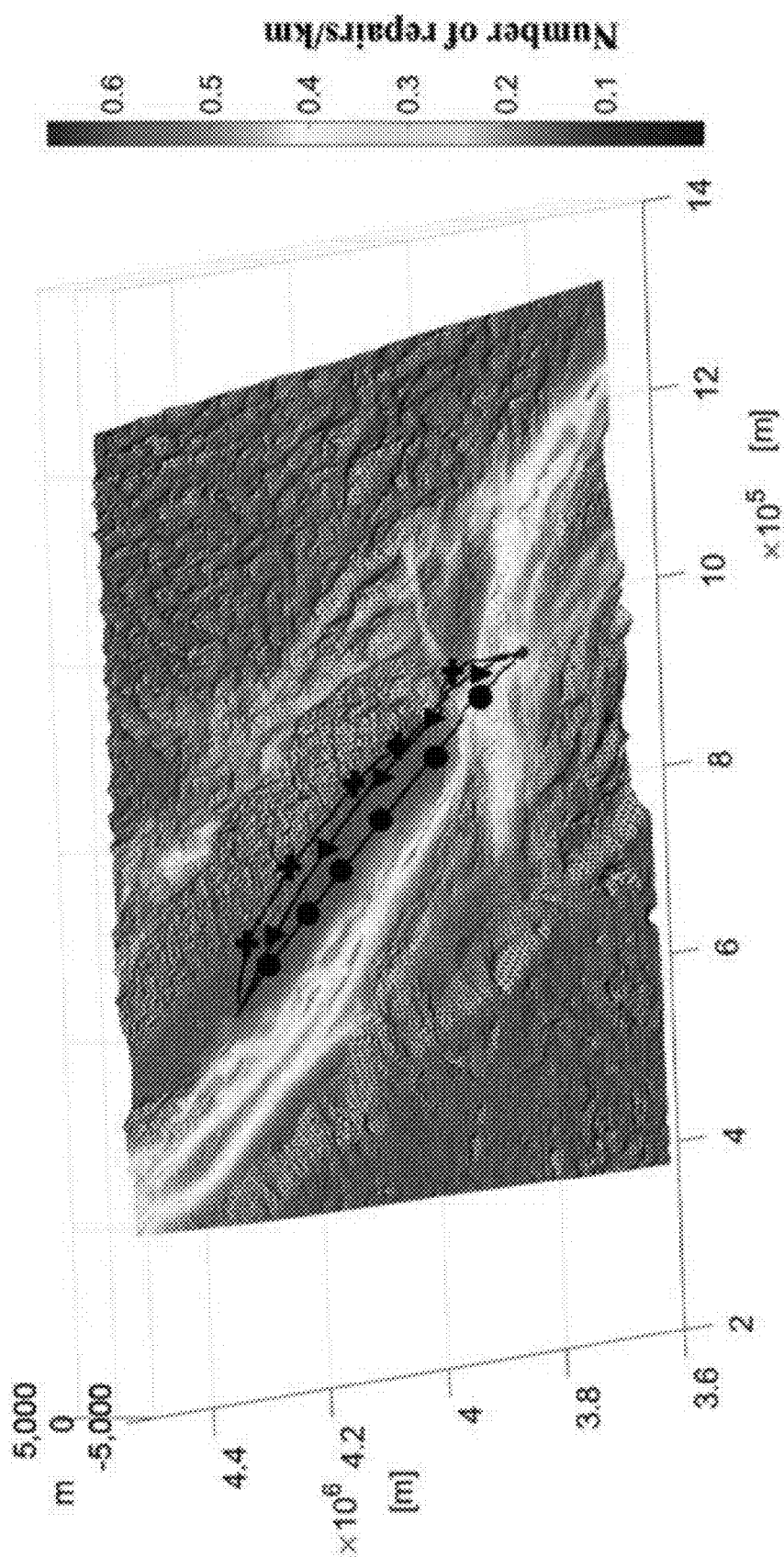
FIG. 11 is a graph illustrating triangulation in the UTM coordinate system, repair rate, and non-dominated optimal solutions (i.e., paths) when c=0.0252 (solid circle), 0.2188 (triangle), and c=10 (cross), where the color represents repair rate.
Figure 13:
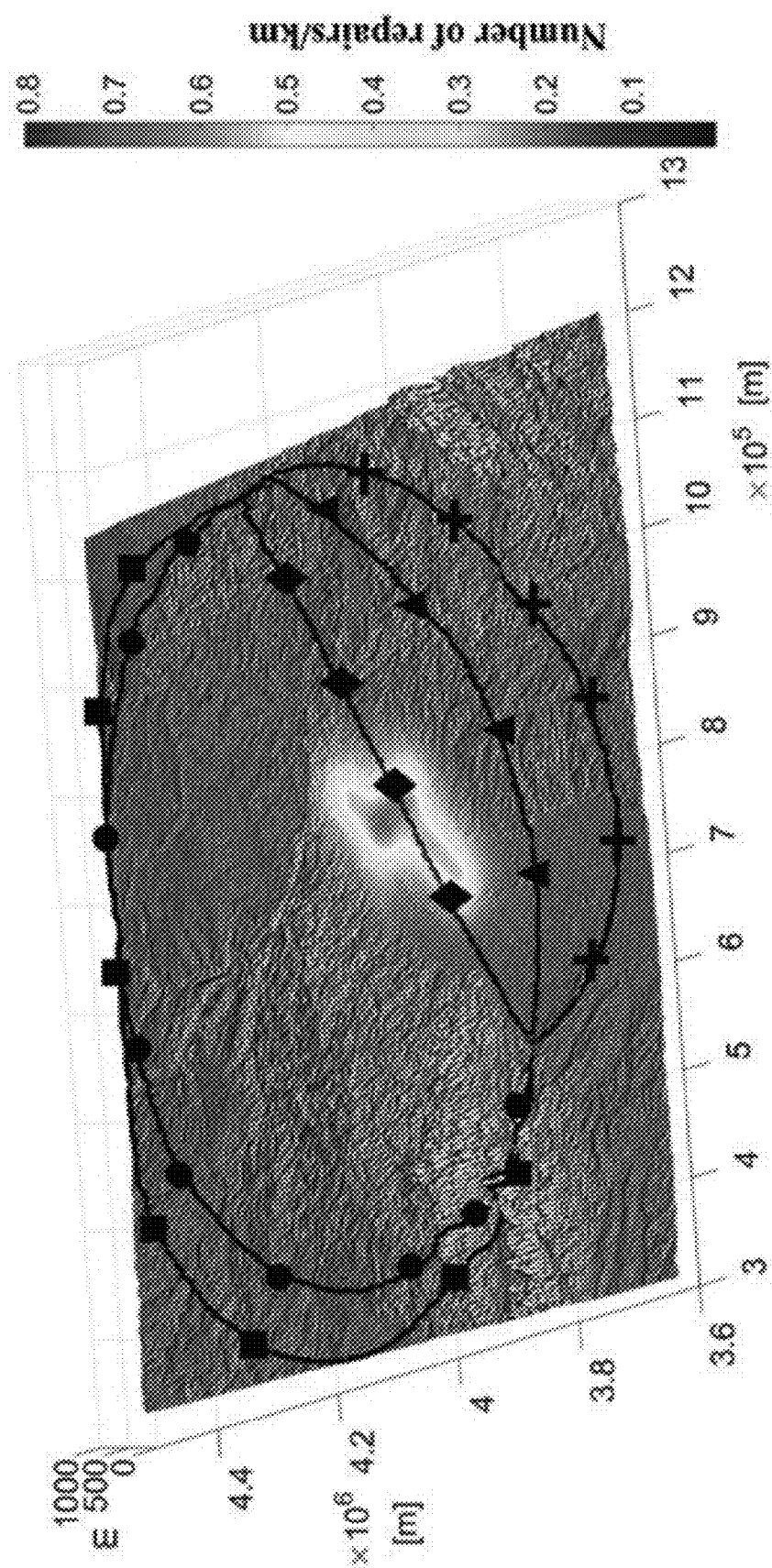
FIG. 13 is a graph illustrating triangulation in the UTM coordinate system, repair rate, and non-dominated optimal solutions (i.e., paths) when c=$_3$0.8905×10-4 (diamond), 6.6× 10-3 (triangle), 6.8×10-3 (cross), 0.1514 (solid circle), and c=10 (square), where the color represents repair rate.

Then, the PGV is converted to repair rate by equation (17). To calculate geodesic distance, download the elevation data of the corresponding areas from the National Oceanic and Atmospheric Administration (http://maps.ngdc.noaa.gov), which contains space-delimited, rectangularly gridded data with the same resolution as the repair rate data in latitude and longitude. Coordinate transformation is applied for both the repair rate data set and the geographic data to convert them from latitude and longitude coordinates to Universal Transverse Mercator coordinates. Using the landform model described, 60,800 faces are created for region $D_1$ and 58,900 faces are created for region $D_2$, and the triangulated manifold approximation of the landforms is shown in FIGS. 11 and 13.

In region $D_1$, the objective is to plan the path of a link from Los Angeles (34.05°, −118.25°) to Davis (38.53°, −121.74°). From FIGS. 9 and 10A, it can be seen that the link connecting the two cities should pass through the San Andreas fault line unavoidably and that it extends more than 1,000 km through California. By letting $g(S)=0$ and $h(S)=0$ in Problem 2, it is possible to calculate the construction cost of the minimum cost path without considering repairs and the construction cost of the path with minimum total number of repairs, which are $ 598.03 and $637.47, respectively. FIG. 11 shows the optimal paths when the weights of the construction cost of the link are equal to 0.0252, 0.2188, and 10. From FIG. 11, it can be seen that to reduce the total number of repairs through minimizing the number of points on the link that may be affected by an earthquake, the angle between the optimal link and the San Andreas fault line increases gradually around Los Angeles. It then moves away from the San Andreas fault line until it approximates the one with the minimum total number of repairs.

Figure 12:
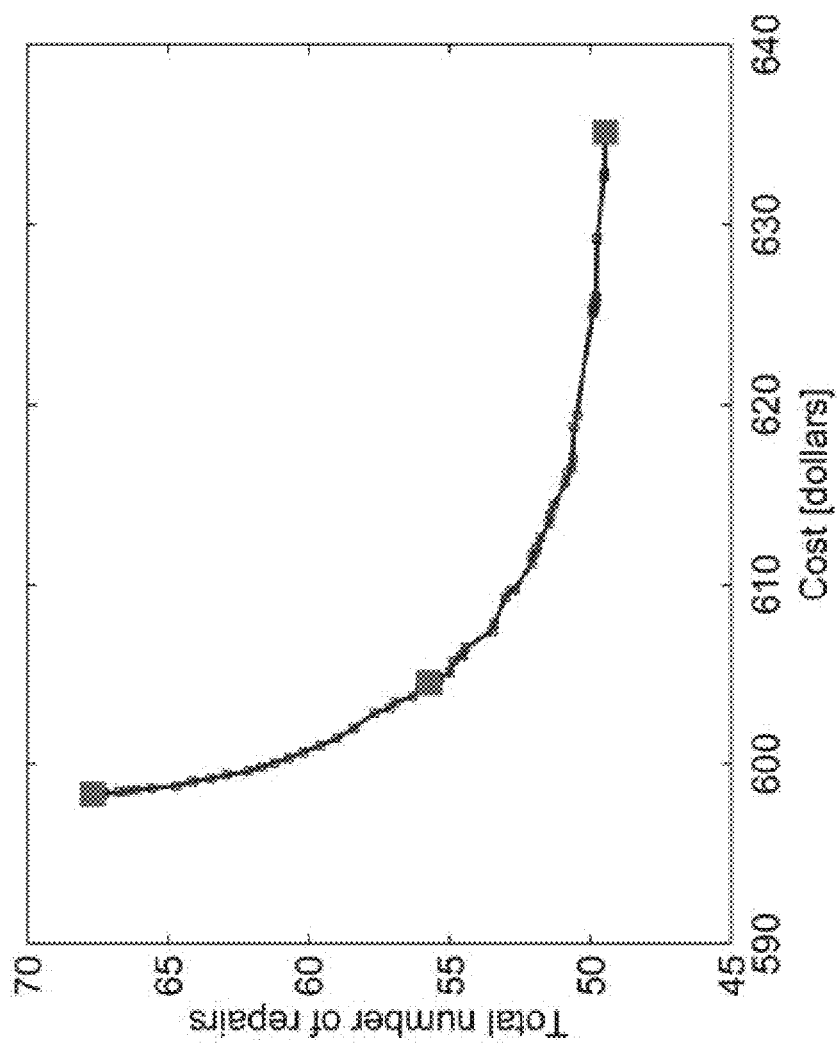
FIG. 12 is a graph showing non-dominated front for two objectives—link construction cost and total number of repairs, where the red squares are the non-dominated optimal values of the paths in FIG. 11.

As in the previous example, set the weight of the construction cost to be from $10^{-3}$ to 10, and then calculate the set of non-dominated optimal solutions and the non-dominated front. FIG. 12 shows the non-dominated front.

In the next and final example, the objective is to plan the path of a link from Little Rock (34.66°, −92.29°) to Louisville (38.24°, −85.76°) in region $D_2$. Since the New Madrid fault line is not as long as the San Andreas fault line, a link connecting the two cities can avoid the hazard zone if it is long enough. To calculate the non-dominated optimal solutions and the non-dominated front, set the weight of the construction cost to be in the range between $10^{-4}$ and 10.

Figure 14:
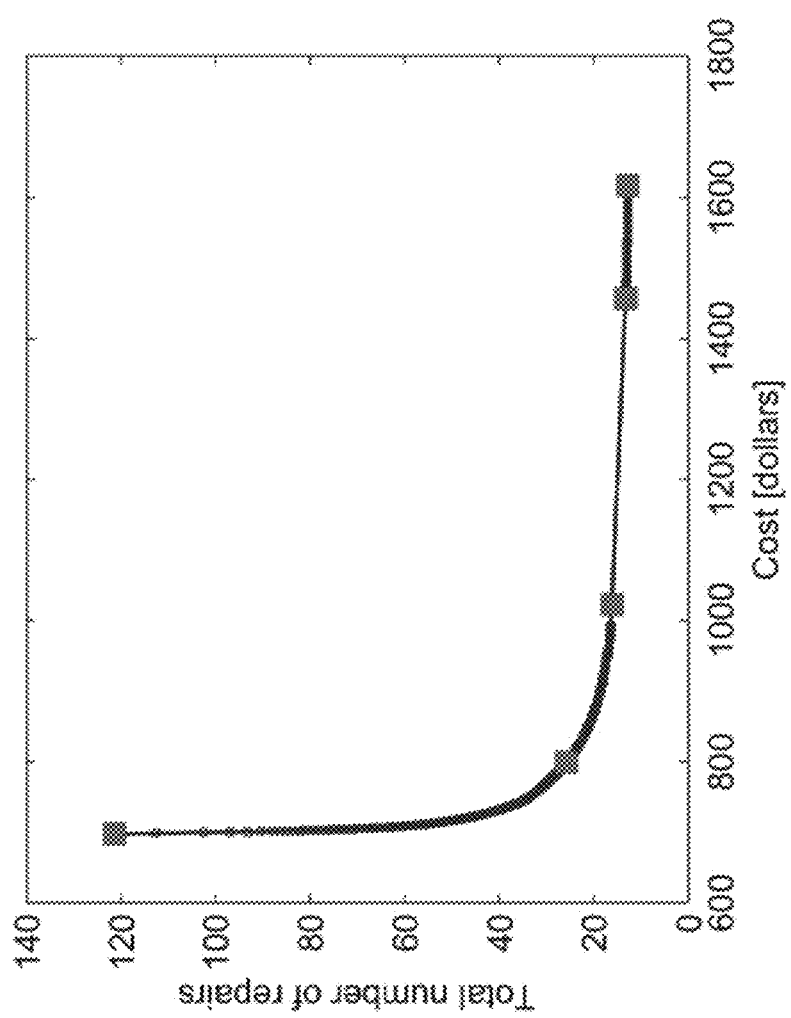
FIG. 14 is a graph showing non-dominated front for two objectives—link construction cost and total number of repairs, where the red squares are the non-dominated optimal values of the paths in FIG. 13.

FIG. 14 presents the non-dominated front. The construction cost of the minimum cost path without considering repairs and the construction cost of the path with minimum total number of repairs are $696.2 and $1,628, respectively. FIG. 13 shows the non-dominated optimal paths when the weights of the construction cost of the link are equal to $3.8905 \times 10^{-4}$, $6.6 \times 10^{-4}$, $6.8 \times 10^{-3}$, 0.1514, and 10. As in the first example, to reduce the total number of repairs, the link will be very far away from the fault line in which case the construction cost of the link will increase significantly. From FIG. 14, it can be seen that increasing the construction cost of the link from $700 to $800 can reduce the total number of repairs significantly (around 100 repairs). However, increasing the construction cost of the link from $1,000 to $1,600 will lead to very limited reduction in the number of repairs. This provides valuable insight to design trade-offs between construction cost-effectiveness and survivability.

Advantages

The above embodiments of the invention have provided a method for path planning of a critical infrastructure link based on the minimization of two objectives: construction cost and potential number of required repairs. In this way, cost and risk (especially from earthquakes) can be trade-off and the near optimal path in terms of cost for any given level of risk and in terms of risk for any given budget can be obtained. The above embodiments are based on multiobjective optimization using the FMM algorithm and real data including PGV, topography, and other relevant information on the area under consideration. By a 2D landform application and two 3D landform applications, it has been demonstrated that the above embodiments can provide a path that achieves near-minimal total number of potential repairs for a given construction cost budget, reducing both the failure probability and the time to recovery and therefore improved seismic resilience. On the other hand, given the seismic resilience required (as measured by expected number of repairs), the above embodiments can provide the path that achieves a cost-effective path.

Exemplary Application—Path Planning for Submarine Cable Network Extension

Telecommunication cables play a crucial role in the transfer of data from one location to another. Submarine telecommunication cables carry over 99% of global data traffic. A significant engineering problem is to determine how new cables will be laid to connect into existing cable networks, for instance, when a branch cable connects to trunk networks or a cable is laid in brownfield scenarios where a network already exists. In practice, a new telecommunication cable in such system cannot be connected to an arbitrary position of an existing cable; instead, only two choices of connection location are possible: the new cable connects from the new site either to a branching unit built in to an existing cable, or to a cable landing station of the existing network. A cable landing station is an interface between the submarine cable system and the overland aerial transmission system. A branching unit is a device installed to enable splitting of the cable to serve multiple destinations.

Typically, branching units are installed on telecommunication cables for future addition of a branch to the system. Examples include: two telecommunication cable branches connect Fujairah UAE and China to the trunks of the FLAG Europe-Asia cable system; the APG (Asia Pacific Gateway) submarine cable system with 9 branching units that connect Korea, Mainland China, Japan, Taiwan, Hong Kong, Vietnam, Thailand, Malaysia and Singapore; and the ACE (African Coast to Europe) submarine cable system connects 23 countries with 20 branches.

This embodiment provides a method of physical path optimization for a telecommunication cable connecting a given site to an existing cable network. The method in this embodiment is developed based on the embodiment of cable path optimization as generally described above. Features disclosed in this embodiment and features disclosed in the other embodiments may be interchangeable or combined.

Design Considerations

Considerations when designing an optimal path for the telecommunication cable in this embodiment can be generally divided into two major classes: environmental considerations and human activities.

A. Environmental Considerations

1. Landslides and Turbidity Current

Landslides and turbidity currents (dense currents driven by gravity carrying considerable sediment-debris and capable of flowing quickly across the seabed) are two major natural hazards that damage submarine cables and associated cable systems. These two hazards can generate enough power to break multiple submarine cables over hundreds of kilometers. They are commonly triggered by seismic activities, storms and tsunamis in downward landforms, which are prone to favour gravitational effects.

2. Seismic Hazards and Tsunamis

Seismic hazards typically include earthquakes and volcanic activities. Volcanic eruptions can damage submarine cables through lava flows and avalanches of hot debris directly. Earthquakes and volcanic eruptions can also result in significant displacements of the seabed and destabilization of the seabed sediment by liquefaction, surface faulting and landslides.

A catastrophic tsunami is capable of triggering a debris avalanche. The triggered debris can increase the power of the tsunami wave. Finally, a series of very powerful sea waves can sweep over the coast and devastate the cable landing stations and cables laid on the inshore.

3. Water Depth

Generally, the risk level and budget of a cable have a closed relationship with the water depth the cable laid on. Coast and inshore areas down to approximately 200 m water depth are not only most frequently exposed to nature hazards caused by slope current systems and weather, but also incur over 65% of annual cable faults caused by inappropriate human activities. The cables laid on the shallow sea areas are, consequently, generally double armoured and buried 1.0-1.5 m to provide the necessary protection, resulting in additional cost. As water depth increases, the threat to cables from human activities decreases. At depths over 1000 m, designers usually prefer lightweight cable because the threats to cables are relatively rare.

Generally, submarine cables can be buried or laid on the seabed surface to full ocean depth, a constraint imposed by the difficulties of raising cables from deep sea for repair.

4. Slope

Steep slopes emphasize the gravitational forces that are prone to generate hazards such as landslides. Commonly, in relatively steep areas, it is necessary for cable routes to be orthogonal to the slope and have minimal course alterations. Such course changes reduce the lateral contacting surface area of the cable with the seabed. In case of sediment failure, the tension on the cable is lesser and ultimate failure is possibly avoided. And generally, the cable ship prefers straight laying, optimizing the chance of the cable touchdown point being in the desired location.

5. Sediment

In burial areas, rocky seabed terrains need to be avoided because of the difficulty of burying, and rough seabed terrain creates conditions favouring cable abrasion and fatigue. Commonly, soft and loose sediment types are preferred for the laying or burying of cables. Where rocky regions are unavoidable, available protection methods for cables are adopted including double armouring of the cable, articulated pipes and cable anchors. Operational considerations and practical environment determine which protection method will be chosen.

B. Human Activities

1. Fishing Activities

Bottom trawling fishing is the principal cause for cable faults worldwide. The equipment used in bottom trawling activities and the dredge rakes along the trench to harvest products such as clams and scallops can dig dozens of centimeters into the seabed. This behaviour can directly and severely damage unburied cables or cables not sufficiently buried.

2. Anchors

Anchors are another important detrimental effect of external aggressions to result in cable faults. Typically, anchors damage cables in two ways: heavy anchors dig into soft seabed floors crushing cables directly, and laid anchors can be dragged over a long distance by a vessel before being noticed. The possibility of the first way generally is not very high but in approved anchorage areas the risk increases greatly. The second way results in cables laid on the dragging route being damaged severely by this unintentional behaviour.

3. Existing Submarine Cables and Pipelines

Cable route designers need to reserve sufficient space for repair and maintenance between the new cable route and other existing or planned submarine cables and pipelines. In congested areas with submarine cables and pipelines, crossing these plants is unavoidable. The International Cable Protection Committee (https://www.iscpc.org/) highly recommends that the crossing angles should not be less than 45° to ensure cable laying, repair and maintenance can be executed.

4. Offshore Exploitation and Concessions Blocks

The designed cable route may conflict with offshore hydrocarbon platforms, offshore renewable energy infrastructures and seabed mineral exploitations. Near the energy infrastructures or a planned exploitation region, inevitable drilling operations and seabed explorations impose a potential threat to submarine cables even the cables buried well. In fact, the deployment, repair and maintenance of cables need to keep distance more than 1 time water depth from other seabed equipment used for petroleum or renewable energy.

5. Permitting

Survey and installation vessels need permission from coastal states before carrying out survey, laying, repair or maintenance in their territorial areas and archipelagic waters. Occasionally, it is more time consuming to obtain permission from coastal states to carry out hydrographic surveys for route design within their territorial areas or archipelagic waters. In addition to coastal states, appropriate permissions or agreements are required from the other seabed users such as offshore hydrocarbon platforms if a conflict exists; these result in extra time delays and potential costs. In order to minimize potential time delays and cost that are incurred in seeking permissions, third party territorial waters where there is no landing site are commonly kept to a minimum.

6. Prohibited Areas and Anthropogenic Obstructions

Known prohibited areas such as marine protected areas, military areas and disputed territories are avoided. It is extremely hard and time consuming to request permissions for cable operations in these prohibited areas from relevant departments. For safety considerations, sea areas potentially suffering or in the process of a war, terrorism or piracy attacks are totally avoided. Also, areas with anthropogenic obstructions such as shipwreck and unexploded ordinance are completely avoided.

Modeling

A. Terrain Surfaces Modeling

The method in this embodiment is built using state-of-the-art geographic information science for terrain modeling. Specifically, in this embodiment, the terrain is modelled as a closed two-dimensional triangulated manifold M, which is embedded in three-dimensional Euclidean space $R^3$. In this example, it is sufficient to represent it as the gridded graph of a continuously differentiable single-valued function $z=\xi(x, y)$, where z is the elevation of the point, and x, y are Cartesian coordinates. More details have been provided in the above description of the other embodiment.

B. Cost Functions Modeling

Each design consideration is a unique criterion affecting the life-cycle cost of a submarine cable. For several special design considerations, their cost functions can be formulated intuitively. For instance, for permitting, the cable life-cycle cost can be set to infinity in restricted areas such as military areas and marine protected areas if permissions or agreements of these restricted areas cannot be obtained.

Leaving aside these special design considerations, cable route designers formulate the cost functions for other design considerations empirically and continually make corrections depending on actual conditions. For example, as discussed previously, water depth has a direct impact on the cable life-cycle cost. Deeper water requires longer distances for laying. However, laying in shallow water is not necessarily cheaper than in deep water because of the need to use double armoured cable, and to bury them to mitigate risks discussed above. Generally a segmented function is used to model the cost caused by water depth, where each segment is an increasing function of length of cable.

C. Life-Cycle Cost Modeling

Finding the optimal path for a cable is complex because many design considerations has to be considered simultaneously to obtain a life-cycle least cost path. Essentially, in this embodiment, the problem can be considered as a single-objective but multi-criteria optimization problem. For a particular location X in M, $$h(X) = w_1 f_1(X) + w_2 f_2(X) + \ldots + w_n f_n(X) \quad (1)$$

where h(X) is per unit length cost of the cable passing through the location X, index n is the number of design considerations, $f_i(X)$ indicates the cost function of the $i^{th}$ design consideration and $w_i$ is the weight of the corresponding design consideration.

Denote γ as a cable connecting two nodes in M. Let H(γ) describe the total life-cycle cost of the cable γ. Without loss of generality, it is assumed that:

For any particular site X in M, the life-cycle cost dH(γ) can be obtained throughout multiplying the life-cycle cost h(X) and the arbitrarily small length ds, namely, h(X)ds.

The total life-cycle cost H(γ) can be calculated by summing of the cost of per unit length for the whole cable γ, that means an integral along the cable path γ for the total length of cable γ.

Problem Formulation and Path Planning Methodology

Based on the models in the previous embodiments, the method for minimization of life-cycle cost in the present embodiment is as follows.

Let node A be the fixed point with coordinates $X_A$ in M. Let $\gamma_1, \gamma_2, \ldots, \gamma_n$ be the existing cables in the cable system network in M. The objective is to lay a cable γ from $X_A$ to an unknown end location $X_B$ with the minimal life-cycle cost $\min_\gamma H(\gamma)$. The end node B should belong to one of the existing cables $\gamma_i$, i=1, 2, . . . , n. The optimization problem can be described as:

$$\min_\gamma H(\gamma) = \min_\gamma \int_0^{l(\gamma)} h(X(s))ds \text{ such that } y(A) = X_A; \quad (2)$$

and $y(B) = X_B$, node B belongs to one of the existing cables $\gamma_i$, i=1, 2, . . . , n, given $\gamma_1, \gamma_2, \ldots, \gamma_n$.

Here, the objective curve γ is parameterized as a function of arc length, s, a location X∈γ being written X=X(s).

Equation (2) can be converted into a non-linear partial differential equation, the Eikonal equation, which arises in problems of wave propagation. Intuitively, a propagated wavefront emanating from a given start node A yields a group of nodes with the same value for the minimal line integral from node A (to each node of the wave front) where distance is determined by the single objective function obtained by merging the multiple criteria (e.g., design considerations). The solution to the Eikonal equation provides a series of wavefronts propagating until one hits the end node B. The desired optimal path is obtained by tracking back from the node B to the start node A through all the wavefronts, always choosing the gradient decent since the fastest travelling of the wave is always along the direction perpendicular to the wavefronts. The fundamental principle is described as follows.

For a site S∈M, define a cost function φ(S), which represents the minimum of the sum life-cycle cost of the cable laying from the node A to the node S. That is to say, let c be a fixed nonnegative cost, then the set {S∈M|φ(S)=c} is a front. φ(S) is the physical solution of the Eikonal equation as below, $$\|\nabla \phi(S)\| = h(S), \phi(A) = 0 \quad (3)$$

where ∇ represents the gradient operator and $\|\nabla \phi(S)\|$ is the length of the gradient vector $\nabla \phi(S)$. The function h(S) has the same meaning of life-cycle cost described by Equation (1). The gradient of φ(S) can be calculated once O(S) is derived for every point S in M. Based on the gradient of φ(S), the optimal path along the greatest gradient can be obtained. In other words, the optimal path will result by tracking backwards from S to A along the greatest gradient.

The Eikonal equation (3), in practice, often cannot be solved analytically for a general nonnegative cost function h. In fact, its solution does not necessarily need to be differentiable. A numerical method is needed. In this embodiment, the FMM method is adapted to solve the Eikonal equation (3) on M with computational complexity O(N log N), where N is the number of vertices in M.

The goal is to connect node A into the given cable network system with the least life-cycle cost. Based on the given triangulated surface M and FMM, the path planning algorithm for planning a path from node A to an existing network in this embodiment can be performed by the following:

1. Tag all nodes of the given triangulated gridded surface as far for initialization.
2. Tag the start node A as dead and the neighbours (one grid point away) of A as open.
3. Calculate the values of the open nodes by solving the Eikonal equation (3) and check whether one of these new open nodes belongs to the existing network. If yes, this special node B is the destination and the algorithm can be stopped. If not, tag the open node with minimum value as dead and its neighbours tagged far as open. If there are multiple nodes with minimum value φ, choose one randomly to become dead and convert its neighbours with far tags into open.
4. Return to Step 3.
5. Derive the optimal path by solving $$\frac{dX(s)}{ds} = -\nabla \phi$$

given $X(0)=X_B$ i.e., track backwards from B to A along the greatest gradient.

In Step 3, an update schema to calculate the value of φ of the open nodes is required. In this embodiment, a monotone update procedure is adapted to approximate the gradient on a triangulated mesh. One exemplary monotone update procedure is provided in J. Sethian, "*Fast marching methods,*" *SIAM Review*, vol. 41, no. 2, pp. 199-235, 1999. In Step 5, a finite-difference approximation, for example, the first-order Euler method or a seconder-order Heun's integration method, can be used to track backwards the path.

Application

Figures 15A, 15B, 15C:
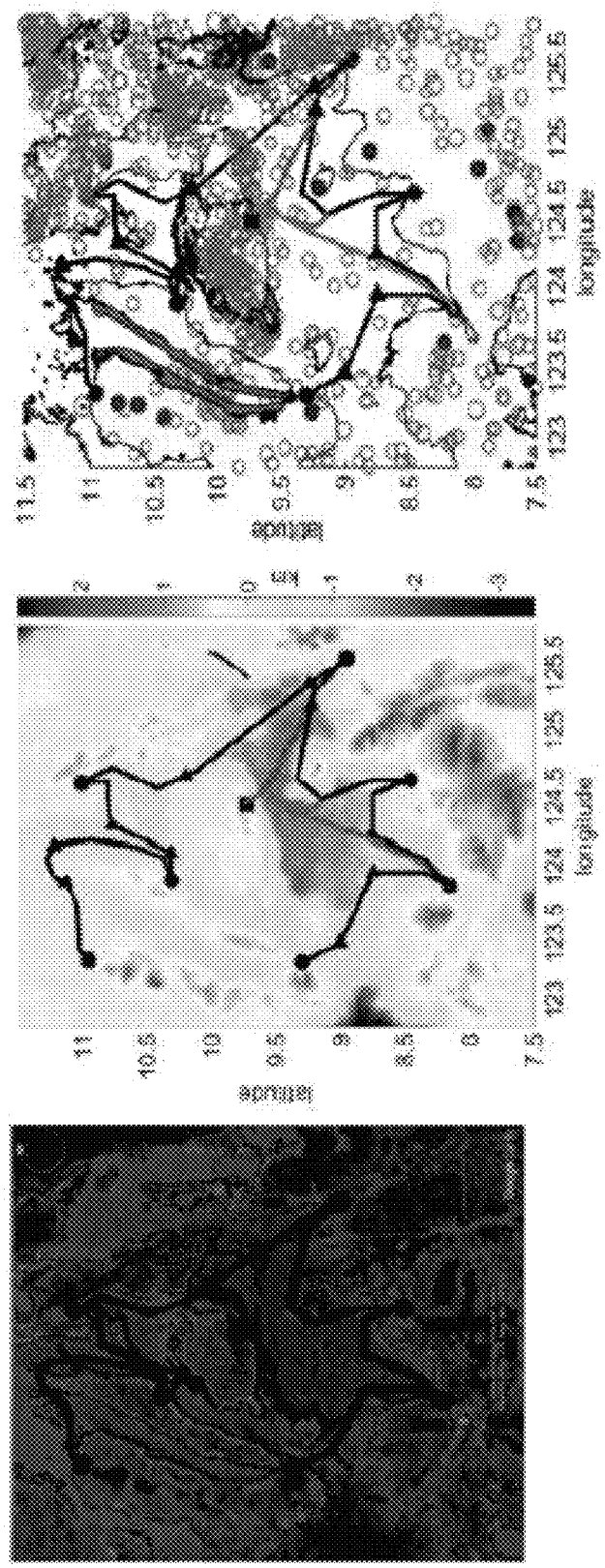
FIG. 15A is a map showing region D in one example, where the black circles indicate the landing stations and the black lines illustrate the DFON cable network, and the black square represents the start node.
FIG. 15B is an elevation map of region D, where black triangles represent branching units on the cables.
FIG. 15C is a coastline of region D, where the blue node indicate locations of volcanoes and the red circles illustrate the sites occurred earthquakes (the larger red circles, the higher magnitude of the historical earthquake), and the red regions represent the coral and sea-grass distribution.
Figures 15D, 15E, 15F:
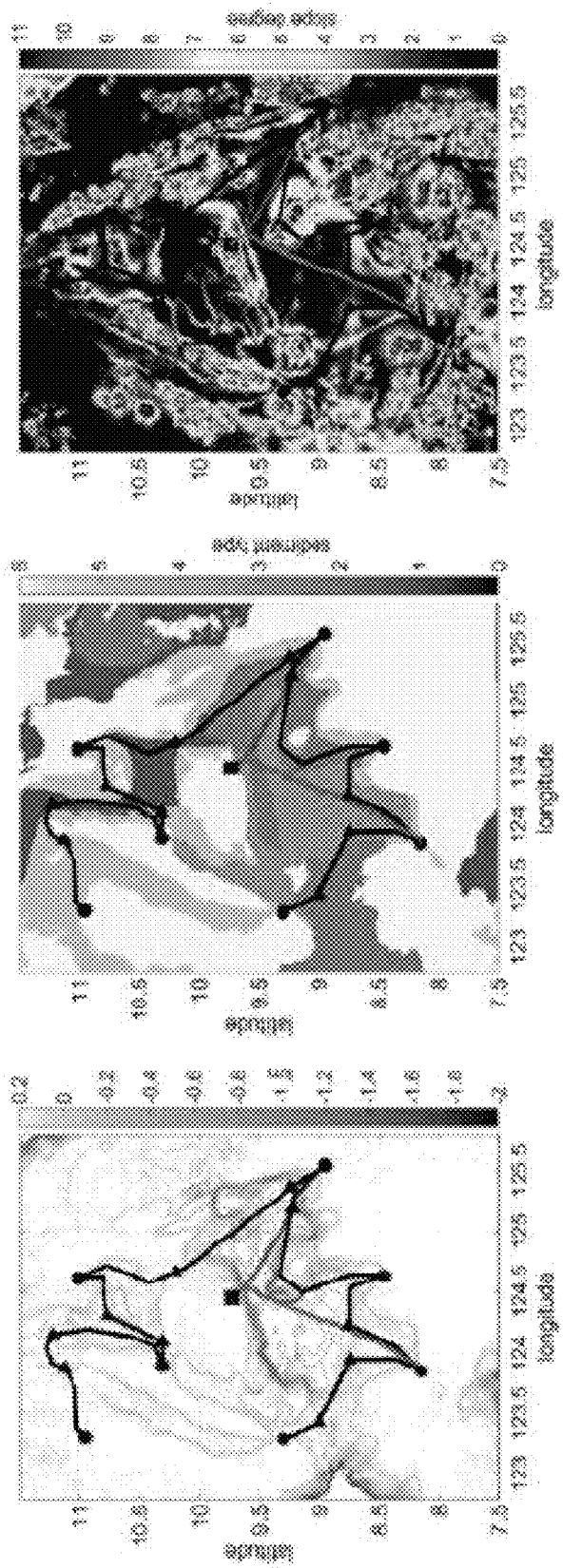
FIG. 15D is an elevation contour map of region D.
FIG. 15E is a sediment map of region D, where the lower value of specific sediment, the looser of the seabed sediment.
FIG. 15F is a slope map of region D.

The method in the present embodiment is applied to a practice scenario for testing. The objective test region D from the southwest point (7.5000° N, 122.8000° E) to northeast point (11.5000° N, 125.8000° E) is located in the Philippines as shown in FIG. 15A. Bohol Island is in the central of the objective area D. West of Bohol Island are Cebu Strait and Cebu Island. To the northeast of Bohol Island is Leyte Island and to the south of Bohol Island, across the Bohol Sea, is Mindanao Island. An existing cable network system, represented by black lines in FIG. 15A, is called the Domestic Fiber Optic Network (DFON) and is run by PLDT Inc. Such network system provides communication services for the major islands of the region D. Bohol Island, with a population of more than 1 million, is not connected to the DFON cable network. The aim of this test is to design a cable path from the start node (9.7287° N, 124.4516° E) on the Bohol Island represented by a black square in FIG. 15A to the existing DFON cable network. Two branching units are installed on the cable whose length is longer than 200 km. And for cables the length less than 200 km, only one branching unit is installed. The locations of the branching units are chosen randomly except that cases where the distance between branching units, or between a branching unit and a landing station, is below 20 km are excluded. Three approaches are considered:

1. The destination can be an arbitrary location on an existing cable.
2. The destination can be a branching unit or a landing station.
3. The destination can be only a landing station.

For the first approach, it is impractical to connect a new cable to an arbitrary point on an existing network. But a lower bound on cost can be obtained through the first approach, a matter of significant practical importance. In this example, only available data related to historical earthquakes, locations of volcanos, slope, seabed sediment, water depth and the distribution of seagrass and coral are considered.

A. Data Source and Description

The locations of the existing cable network DFON and landing locations are obtained from Google Fusion Tables (https://support.google.com/fusiontables/), and the satellite map of D is from Google earth. Data sources of design considerations are:

Historical earthquake data, from 1957 to 2017 with magnitude in excess of 3.5 in D, is available from the United States Geological Survey (USGS, https://earthquake.usgs.gov/)

Volcano locations are downloaded from the National Oceanic and Atmospheric Administration (NOAA, https://www.ngdc.noaa.gov/)

The seabed sediment situation in D is obtained from a map called "Surface sediments and topography of the North Pacific", created by J. Frazer et al.

Rectangularly gridded data of elevation and water depth is downloaded from the General Bathymetric Chart of the Oceans (GEBCO, http://www.gebco.net/) with 30 arc-second increments in longitude and latitude The seagrass and coral regions are extracted from two databases, Global Distribution of Seagrasses and Global Distribution of Coral Reefs (http://data.unep-wcmc.org/datasets/), respectively.

Slope on each gridded node of D is calculated from the downloaded elevation data B. Cost Function of Each Design Consideration The cost function of water depth is a segmented function. For waters with depth less than 200 m, a large value is assigned in order to encourage the cable to pass through the shallow area as quickly as possible. In the range of depths between 200 m and 2500 m, the cost increases as a power of water depth. At depths greater than 2500 m, a large cost is assigned to ensure that the cable avoids the abyssal zone. The cost assigned to earthquakes increases as a function of the earthquake magnitude and of the reciprocal of the distance between the epi-center and the cable. The cost from volcanoes is increased as the reciprocal of the distance between a volcano and the cable increases. The slope cost is also segmented and 11 degree is chosen as a threshold. For slopes of less than 11 degrees, the slope cost function is an increasing function. A very large value is assigned to areas where the slope is in excess of 11 degrees, so that the cable avoids these high slopes as much as possible. Seabed sediment is divided into 5 categories and costs as follows: 1 (very loose), 2 (soft loose), 3 (medium dense), 4 (stiff) and 5 (very stiff and unknown sediment). A lower level corresponds to lower cost. For coral and seagrass, a large cost is assigned to areas of distributed dense coral or seagrass to discourage the cable from entering such regions.

C. Results and Explanations

Two groups of weight values are assigned to the design considerations in this example, as follows:

1. 0.05 (water depth), 0.05 (earthquake), 0.15 (volcano), 0.50 (slope), 0.05 (sediment), 0.20 (coral and seagrass);
2. 0.05 (water depth), 0.50 (earthquake), 0.15 (volcano), 0.20 (slope), 0.05 (sediment), 0.05 (coral and seagrass).

Recall the three approaches provided above, by referring them as Scenarios 1, 2, 3, respectively. For the first group, the slope is regarded as the highest priority and the largest weight value 0.50 is assigned to it. Coral and volcano are relative important and are allocated 0.20 and 0.15, respectively. In FIGS. 15A-F, the brown curve, red curve and magenta curve corresponds to Scenarios 1, 2, 3, respectively. From FIG. 15F, it can be observed that the three routes avoid the high slope areas as much as possible. Earthquake is the top priority in the second group with the largest weight value 0.50 and the corresponding results of three scenarios are displayed in FIG. 15C. Note that the three routes in that figure avoid dense earthquake areas as much as possible. The total length and cost for the three cases of two groups are shown in Table I. Based on the results in Table I, the cost to connect a cable from a given site to a branching unit or a landing station (Scenario 2) is much lower than laying a cable from the given site to a landing station directly (Scenario 3). Reasonable location design for branching units can decrease the cable laying cost effectively. In addition, by considering Scenario 1, a lower bound on cost can be obtained for arbitrary placement of a branching unit, a matter of significant practical importance.

TABLE I

Results for the three scenarios and two cost functions first group

|  | arbitrary node | branching unit or landing station | landing station |
|---|---|---|---|
| first group |  |  |  |
| length (km) | 75.431 | 101.195 | 198.879 |
| cost ($10^3$ dollars) | 367.63 | 437.84 | 811.14 |
| second group |  |  |  |

TABLE I-continued

Results for the three scenarios and two cost functions first group

| | arbitrary node | branching unit or landing station | landing station |
|---|---|---|---|
| length (km) | 51.992 | 68.248 | 148.110 |
| cost ($10^3$ dollars) | 1220.6 | 1741.5 | 2963.8 |

Advantages

The method in the embodiment has provided an efficient and reliable way to design a cable route between a new site and an existing cable network with the aim to minimize life-cycle cost. The exemplary method is based on solving an optimization problem with a cost model that includes real-life design considerations for the cable route. Assignment of weights to the various design considerations, leads to the use of a path planning method based on FMM to obtain the optimal path between a node and an existing network. The method in the embodiment has also provided a cost model for estimation of the cable lifecycle cost based on measurable quantities associated with the various attributes of the geographical locations that the cable traverses. Significantly, the model in the embodiment enables different stakeholders to have different priorities. The illustrated method also considers multiple design criteria that assign weights to each attribute (consideration) and permit different weights for different stakeholders. Other attributes (considerations) such as rocky seabed, water depth, fishing area, marine protected areas, and offshore concession blocks (petroleum, minerals and renewable energy) can be taken into account.

Exemplary System

Figure 16:
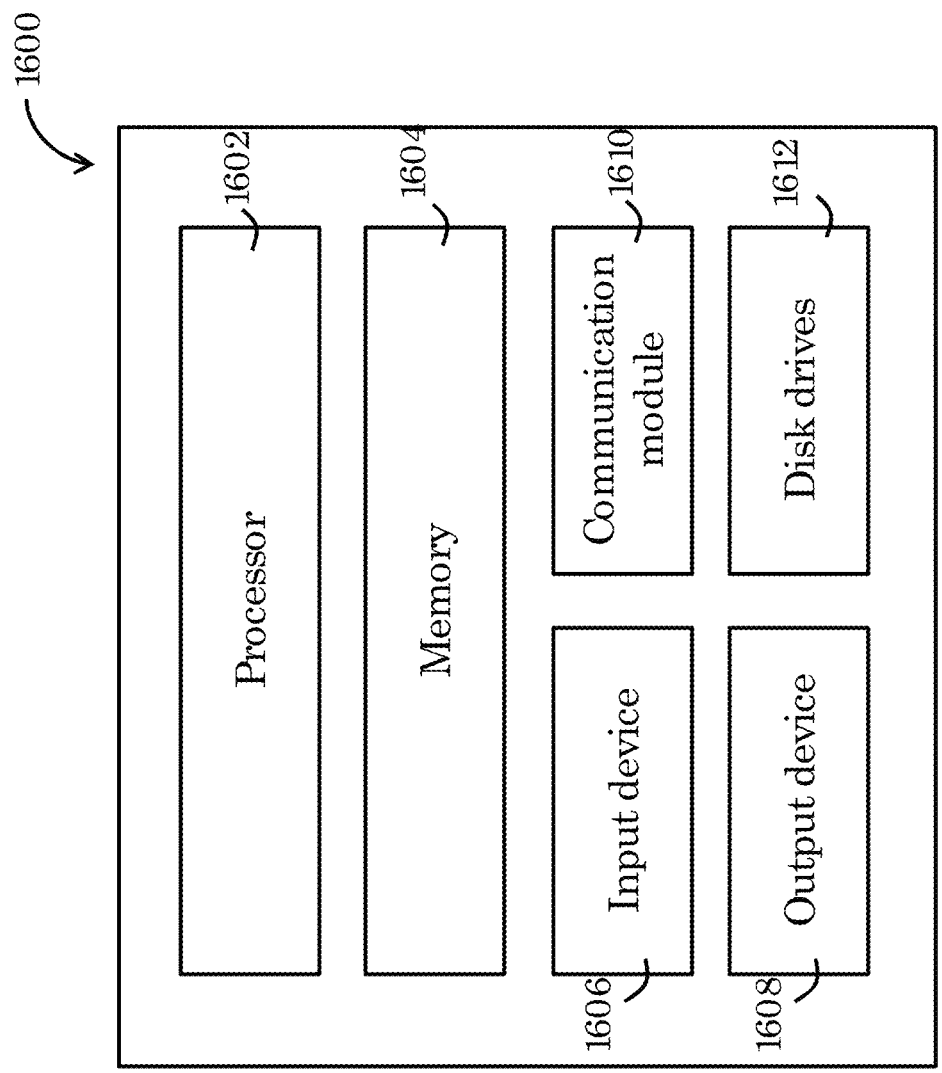
FIG. 16 is an information handling system that can be configured to operate the method in one embodiment of the invention.

Referring to FIG. 16, there is shown a schematic diagram of an exemplary information handling system 1600 that can be used as a server or other information processing systems in one embodiment of the invention for performing the method in the invention. Preferably, the server 1600 may have different configurations, and it generally comprises suitable components necessary to receive, store and execute appropriate computer instructions or codes. The main components of the server 1600 are a processing unit 1602 and a memory unit 1604. The processing unit 1602 is a processor such as a CPU, an MCU, etc. The memory unit 1604 may include a volatile memory unit (such as RAM), a non-volatile unit (such as ROM, EPROM, EEPROM and flash memory) or both. Preferably, the server 1600 further includes one or more input devices 1606 such as a keyboard, a mouse, a stylus, a microphone, a tactile input device (e.g., touch sensitive screen) and a video input device (e.g., camera). The server 1600 may further include one or more output devices 1608 such as one or more displays, speakers, disk drives, and printers. The displays may be a liquid crystal display, a light emitting display or any other suitable display that may or may not be touch sensitive. The server 1600 may further include one or more disk drives 1612 which may encompass solid state drives, hard disk drives, optical drives and/or magnetic tape drives. A suitable operating system may be installed in the server 1600, e.g., on the disk drive 1612 or in the memory unit 1604 of the server 1600. The memory unit 1604 and the disk drive 1612 may be operated by the processing unit 1602. The server 1600 also preferably includes a communication module 1610 for establishing one or more communication links (not shown) with one or more other computing devices such as a server, personal computers, terminals, wireless or handheld computing devices. The communication module 1610 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 1602, the memory unit 1604, and optionally the input devices 1606, the output devices 1608, the communication module 1610 and the disk drives 1612 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the server 1600 shown in FIG. 16 is merely exemplary, and that different servers 1600 may have different configurations and still be applicable in the invention.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. For example, the method can be applied to determine optimal laying arrangement of any infrastructure link, including fluid pipeline (e.g., oil, water, and gas pipes), electric power cables, electric data cables, optical cables, etc. The present embodiments are to be considered in all respects as illustrative, not restrictive.

The invention claimed is:

1. A method for determining an optimal laying arrangement of a new infrastructure link for connection from a new site to an existing infrastructure network, comprising:

modeling a terrain of a region around and at the new site and the existing infrastructure network near the new site;

modeling each factor affecting the laying arrangement as a respective cost function;

applying a respective weighting to each of the cost function to determine a life-cycle cost function; and determining, based on the determined life-cycle cost function, an optimized laying arrangement with minimal life-cycle cost from the new site to a connection point in the existing infrastructure network, wherein the determination of the optimized laying arrangement comprises solving the following optimization equation:

$$\min_\gamma \mathbb{H}(\gamma) = \min_\gamma \int_0^{l(\gamma)} h(X(s))ds$$

such that γ(A)=$X_A$; and γ(B)=$X_B$;

where H(γ) is a total life-cycle cost for an infrastructure link, A and B denote two end points of the new infrastructure link, with B being an existing infrastructure link $\gamma_i$, i=1, 2, ..., n, given $\gamma_1, \gamma_2, ..., \gamma_n$.

2. The method of claim 1, wherein the modeling of the terrain comprises modeling the terrain as a closed 2D triangulated manifold.

3. The method of claim 1, wherein the new infrastructure link comprises a new cable and the existing infrastructure network comprises an existing cable network.

4. The method of claim 3, wherein the connection point is a branching unit of an existing cable or a cable landing station of the existing cable network.

5. The method of claim 3, wherein the new cable comprises a telecommunication cable and the existing cable network comprises an existing telecommunication cable network.

6. The method of claim 3, wherein the new cable comprises a submarine cable and the existing cable network comprises a submarine cable network.

7. The method of claim 1, wherein the plurality of factor includes environmental factors and human factors.

8. The method of claim 1, wherein the optimized laying arrangement comprises the optimized laying route.

9. The method of claim 1, further comprising displaying the optimized laying arrangement on a model of the terrain.

10. The method of claim 1, further comprising:
transforming the optimization equation using Eikonal equation; and
applying fast marching method to solve the transformed equation for determination of the optimized laying arrangement.

11. A non-transitory computer readable medium for storing computer instructions that, when executed by one or more processors, causes the one or more processors to perform a method for determining an optimal laying arrangement of a new infrastructure link for connection from a new site to an existing infrastructure network, comprising:
modeling a terrain of a region around and at the new site and the existing infrastructure network near the new site;
modeling each factor affecting the laying arrangement as a respective cost function;
applying a respective weighting to each of the cost function to determine a life-cycle cost function; and
determining, based on the determined life-cycle cost function, an optimized laying arrangement with minimal life-cycle cost from the new site to a connection point in the existing infrastructure network, wherein the determination of the optimized laying arrangement comprises solving the following optimization equation:

$$\min_\gamma \mathbb{H}(\gamma) = \min_\gamma \int_0^{l(\gamma)} h(X(s))ds$$

such that γ(A)=$X_A$; and γ(B)=$X_B$;
where H(γ) is a total life-cycle cost for an infrastructure link, A and B denote two end points of the new infrastructure link, with B being an existing infrastructure link $\gamma_i$=1, 2, ..., n, given $\gamma_1, \gamma_2, ..., \gamma_n$.

12. The non-transitory computer readable medium of claim 11, wherein the modeling of the terrain comprises modeling the terrain as a closed 2D triangulated manifold.

13. The non-transitory computer readable medium of claim 11, wherein the new infrastructure link comprises a new cable and the existing infrastructure network comprises an existing cable network.

14. The non-transitory computer readable medium of claim 13, wherein the connection point is a branching unit of an existing cable or a cable landing station of the existing cable network.

15. The non-transitory computer readable medium of claim 13, wherein the new cable comprises a telecommunication cable and the existing cable network comprises an existing telecommunication cable network.

16. The non-transitory computer readable medium of claim 13, wherein the new cable comprises a submarine cable and the existing cable network comprises a submarine cable network.

17. The non-transitory computer readable medium of claim 11, wherein the plurality of factor includes environmental factors and human factors.

18. The non-transitory computer readable medium of claim 11, wherein the optimized laying arrangement comprises the optimized laying route.

19. A system for determining an optimal laying arrangement of a new infrastructure link for connection from a new site to an existing infrastructure network, the system comprising one or more processors configured to:
model a terrain of a region around and at the new site and the existing infrastructure network near the new site;
model each factor affecting the laying arrangement as a respective cost function;
apply a respective weighting to each of the cost function to determine a life-cycle cost function; and
determine, based on the determined life-cycle cost function, an optimized laying arrangement with minimal life-cycle cost from the new site to a connection point in the existing infrastructure network;
wherein the determination of the optimized laying arrangement comprises solving the following optimization equation:

$$\min_\gamma \mathbb{H}(\gamma) = \min_\gamma \int_0^{l(\gamma)} h(X(s))ds$$

such that γ(A)=$X_A$; and γ(B)=$X_B$;
where is a total life-cycle cost for an infrastructure link, A and B denote two end points of the new infrastructure link, with B being an existing infrastructure link $\gamma_i$, i=1, 2, ..., n, given $\gamma_1, \gamma_2, ..., \gamma_n$.

* * * * *